(12) United States Patent
Lee et al.

(10) Patent No.: US 7,920,317 B2
(45) Date of Patent: Apr. 5, 2011

(54) DISPLAY WITH CONTROLLED FORMATION OF BUBBLES

(75) Inventors: Kar Yue Lee, Burlington, MA (US); Eugene E. Fike, III, Amesbury, MA (US); Mark B. Andersson, Boston, MA (US); John J. Fijol, Shrewsbury, MA (US); Jorma Antero Peltola, Chelmsford, MA (US); Susan Oakley, Oxford, MA (US); Roger W. Barton, Grand Marais, MN (US)

(73) Assignee: Pixtronix, Inc., Andover, MA (US)

( * ) Notice: Subject to any disclaimer, the term of this patent is extended or adjusted under 35 U.S.C. 154(b) by 169 days.

(21) Appl. No.: 12/221,606

(22) Filed: Aug. 4, 2008

(65) Prior Publication Data

US 2010/0027100 A1 Feb. 4, 2010

(51) Int. Cl.
*G02F 1/03* (2006.01)
*G02B 26/00* (2006.01)
*G02B 26/02* (2006.01)

(52) U.S. Cl. ........ 359/253; 359/228; 359/290; 349/153; 349/182; 349/149

(58) Field of Classification Search .......... 359/290–295, 359/298, 228, 245, 253, 265, 272; 349/153–156, 349/158, 182, 187, 189, 190; 156/145, 285, 156/382; 324/301; 345/107; 445/23–25
See application file for complete search history.

(56) References Cited

U.S. PATENT DOCUMENTS

| 4,564,836 A | 1/1986 | Vuilleumier et al. |
| 4,889,603 A | 12/1989 | DiSanto et al. |
| 5,062,689 A | 11/1991 | Koehler |
| 5,096,279 A | 3/1992 | Hornbeck et al. |
| 5,142,405 A | 8/1992 | Hornbeck |
| 5,233,459 A | 8/1993 | Bozler et al. |
| 5,319,491 A | 6/1994 | Selbrede |
| 5,339,179 A | 8/1994 | Rudisill et al. |
| 5,477,086 A | 12/1995 | Rostoker et al. |
| 5,504,389 A | 4/1996 | Dickey |
| 5,517,347 A | 5/1996 | Sampsell |
| 5,687,465 A * | 11/1997 | Hinata et al. ............ 29/402.01 |

(Continued)

FOREIGN PATENT DOCUMENTS

EP 0366847 A2 5/1990

(Continued)

OTHER PUBLICATIONS

Judy, et al, "Self-Adjusting Microstructures(SAMS)," Proceedings of the Workshop on Micro Electro Mechanical Systems, New York, Jan. 30, 1991, vol. Workshop 4, pp. 51-56.

(Continued)

*Primary Examiner* — Loha Ben
(74) *Attorney, Agent, or Firm* — Ropes & Gray LLP

(57) ABSTRACT

The invention relates to a display apparatus including a first substrate supporting an array of light modulators, a second substrate separated from the first substrate by a gap, a fluid substantially filling the gap, sealing material joining the first substrate to the second substrate, and a bubble trapping region within a space enclosed by the sealing material for substantially constraining a location of a bubble trapped within the gap. In some embodiments, the bubble trapping region extends along a majority of a side of at least one of the substrates. In some embodiments, the fluid has a viscosity less than 70 centipoise.

41 Claims, 24 Drawing Sheets

U.S. PATENT DOCUMENTS

| | | | |
|---|---|---|---|
| 5,745,281 | A | 4/1998 | Yi et al. |
| 5,771,321 | A | 6/1998 | Stern |
| 5,781,331 | A | 7/1998 | Carr et al. |
| 5,784,189 | A | 7/1998 | Bozler et al. |
| 5,794,761 | A | 8/1998 | Renaud et al. |
| 5,835,256 | A | 11/1998 | Huibers |
| 5,986,796 | A | 11/1999 | Miles |
| 6,034,807 | A | 3/2000 | Little et al. |
| 6,046,840 | A | 4/2000 | Huibers |
| 6,079,838 | A | 6/2000 | Parker et al. |
| 6,201,633 | B1 | 3/2001 | Peeters et al. |
| 6,288,824 | B1 | 9/2001 | Kastalsky |
| 6,300,154 | B2 | 10/2001 | Clark et al. |
| 6,300,294 | B1 | 10/2001 | Robbins et al. |
| 6,323,834 | B1 | 11/2001 | Colgan et al. |
| 6,392,736 | B1 * | 5/2002 | Furukawa et al. ............ 349/158 |
| 6,404,942 | B1 | 6/2002 | Edwards et al. |
| 6,531,329 | B2 * | 3/2003 | Asakura et al. ................. 438/30 |
| 6,583,915 | B1 | 6/2003 | Hong et al. |
| 6,600,474 | B1 | 7/2003 | Heines et al. |
| 6,650,455 | B2 | 11/2003 | Miles |
| 6,666,561 | B1 | 12/2003 | Blakley |
| 6,671,078 | B2 | 12/2003 | Flanders et al. |
| 6,674,562 | B1 | 1/2004 | Miles |
| 6,678,029 | B2 * | 1/2004 | Suzuki ........................... 349/154 |
| 6,680,792 | B2 | 1/2004 | Miles |
| 6,701,039 | B2 | 3/2004 | Bourgeois et al. |
| 6,746,886 | B2 | 6/2004 | Duncan et al. |
| 6,775,048 | B1 | 8/2004 | Starkweather et al. |
| 6,787,969 | B2 | 9/2004 | Grade et al. |
| 6,798,935 | B2 | 9/2004 | Bourgeois et al. |
| 6,819,386 | B2 | 11/2004 | Roosendaal et al. |
| 6,827,456 | B2 | 12/2004 | Parker et al. |
| 6,862,072 | B2 * | 3/2005 | Liu et al. ....................... 349/154 |
| 6,906,847 | B2 | 6/2005 | Huibers et al. |
| 6,947,195 | B2 | 9/2005 | Ohtaka et al. |
| 6,961,167 | B2 | 11/2005 | Prins et al. |
| 6,969,635 | B2 | 11/2005 | Patel et al. |
| 6,970,227 | B2 | 11/2005 | Kida et al. |
| 7,019,809 | B2 * | 3/2006 | Sekiguchi ..................... 349/149 |
| 7,038,758 | B2 * | 5/2006 | Suzuki .......................... 349/189 |
| 7,050,141 | B2 | 5/2006 | Yokoue et al. |
| 7,060,895 | B2 | 6/2006 | Kothari et al. |
| 7,075,702 | B2 | 7/2006 | Huibers et al. |
| 7,123,796 | B2 | 10/2006 | Steckl et al. |
| 7,161,094 | B2 | 1/2007 | Kothari et al. |
| 7,164,520 | B2 | 1/2007 | Palmateer et al. |
| 7,184,202 | B2 | 2/2007 | Miles et al. |
| 7,198,982 | B2 | 4/2007 | Patel et al. |
| 7,227,677 | B2 | 6/2007 | Ravnkilde et al. |
| 7,271,945 | B2 | 9/2007 | Hagood et al. |
| 7,274,416 | B2 | 9/2007 | Feenstra et al. |
| 7,291,363 | B2 | 11/2007 | Miller |
| 7,304,785 | B2 | 12/2007 | Hagood et al. |
| 7,304,786 | B2 | 12/2007 | Hagood et al. |
| 7,365,897 | B2 | 4/2008 | Hagood et al. |
| 7,391,493 | B2 * | 6/2008 | Kim ................................ 349/155 |
| 7,391,552 | B2 | 7/2008 | Barton et al. |
| 7,405,852 | B2 | 7/2008 | Hagood et al. |
| 7,417,782 | B2 | 8/2008 | Hagood et al. |
| 7,460,290 | B2 | 12/2008 | Hagood et al. |
| 7,463,227 | B2 | 12/2008 | Van Gorkom |
| 7,502,159 | B2 | 3/2009 | Hagood et al. |
| 7,666,049 | B2 * | 2/2010 | Saito et al. ....................... 445/24 |
| 2001/0048265 | A1 | 12/2001 | Miller et al. |
| 2002/0113281 | A1 | 8/2002 | Cunningham et al. |
| 2002/0163709 | A1 | 11/2002 | Mirza |
| 2002/0191267 | A1 | 12/2002 | Flanders et al. |
| 2003/0068118 | A1 | 4/2003 | Bourgeois et al. |
| 2003/0174422 | A1 | 9/2003 | Miller et al. |
| 2004/0114346 | A1 | 6/2004 | Parker et al. |
| 2004/0145854 | A1 | 7/2004 | Tamura |
| 2005/0104804 | A1 | 5/2005 | Feenstra et al. |
| 2005/0259198 | A1 | 11/2005 | Lubart et al. |
| 2006/0007701 | A1 | 1/2006 | Schoellmann et al. |
| 2006/0152476 | A1 | 7/2006 | Van Gorkom et al. |
| 2006/0187190 | A1 | 8/2006 | Hagood et al. |
| 2006/0187191 | A1 | 8/2006 | Hagood et al. |
| 2006/0209012 | A1 | 9/2006 | Hagood |
| 2006/0250676 | A1 | 11/2006 | Hagood |
| 2006/0256039 | A1 | 11/2006 | Hagood et al. |
| 2006/0270179 | A1 | 11/2006 | Yang |
| 2006/0291771 | A1 | 12/2006 | Braunisch et al. |
| 2007/0007889 | A1 | 1/2007 | Bongaerts et al. |
| 2007/0053652 | A1 | 3/2007 | Mignard et al. |
| 2007/0086078 | A1 | 4/2007 | Hagood et al. |
| 2007/0091038 | A1 | 4/2007 | Hagood et al. |
| 2007/0195026 | A1 | 8/2007 | Hagood et al. |
| 2007/0205969 | A1 | 9/2007 | Hagood et al. |
| 2007/0216987 | A1 | 9/2007 | Hagood et al. |
| 2007/0247401 | A1 | 10/2007 | Sasagawa et al. |
| 2007/0279727 | A1 | 12/2007 | Gandhi et al. |
| 2008/0030827 | A1 | 2/2008 | Hagood et al. |
| 2008/0037104 | A1 * | 2/2008 | Hagood et al. ................ 359/292 |
| 2008/0062500 | A1 | 3/2008 | Hagood |
| 2008/0094853 | A1 | 4/2008 | Kim et al. |
| 2008/0129681 | A1 | 6/2008 | Hagood et al. |
| 2008/0145527 | A1 | 6/2008 | Hagood et al. |
| 2008/0158635 | A1 | 7/2008 | Hagood et al. |
| 2008/0158636 | A1 | 7/2008 | Hagood et al. |
| 2008/0174532 | A1 | 7/2008 | Lewis |
| 2008/0278798 | A1 | 11/2008 | Hagood et al. |
| 2008/0283175 | A1 * | 11/2008 | Hagood et al. ................ 156/145 |
| 2009/0034052 | A1 | 2/2009 | Hagood et al. |

FOREIGN PATENT DOCUMENTS

| | | |
|---|---|---|
| EP | 1674893 | 6/2006 |
| WO | WO-03081315 A1 | 10/2003 |
| WO | WO-2004/088629 | 10/2004 |
| WO | WO-2006/017129 | 2/2006 |
| WO | WO-200609179 A2 | 8/2006 |
| WO | WO-2007145973 | 12/2007 |

OTHER PUBLICATIONS

International Search Report and Written Opinion dated Jun. 29, 2010 in International Application No. PCT/US2009/000922.

International Preliminary Report on Patentability and Written Opinion dated Oct. 28, 2010 in International Application No. PCT/US2009/002288.

* cited by examiner

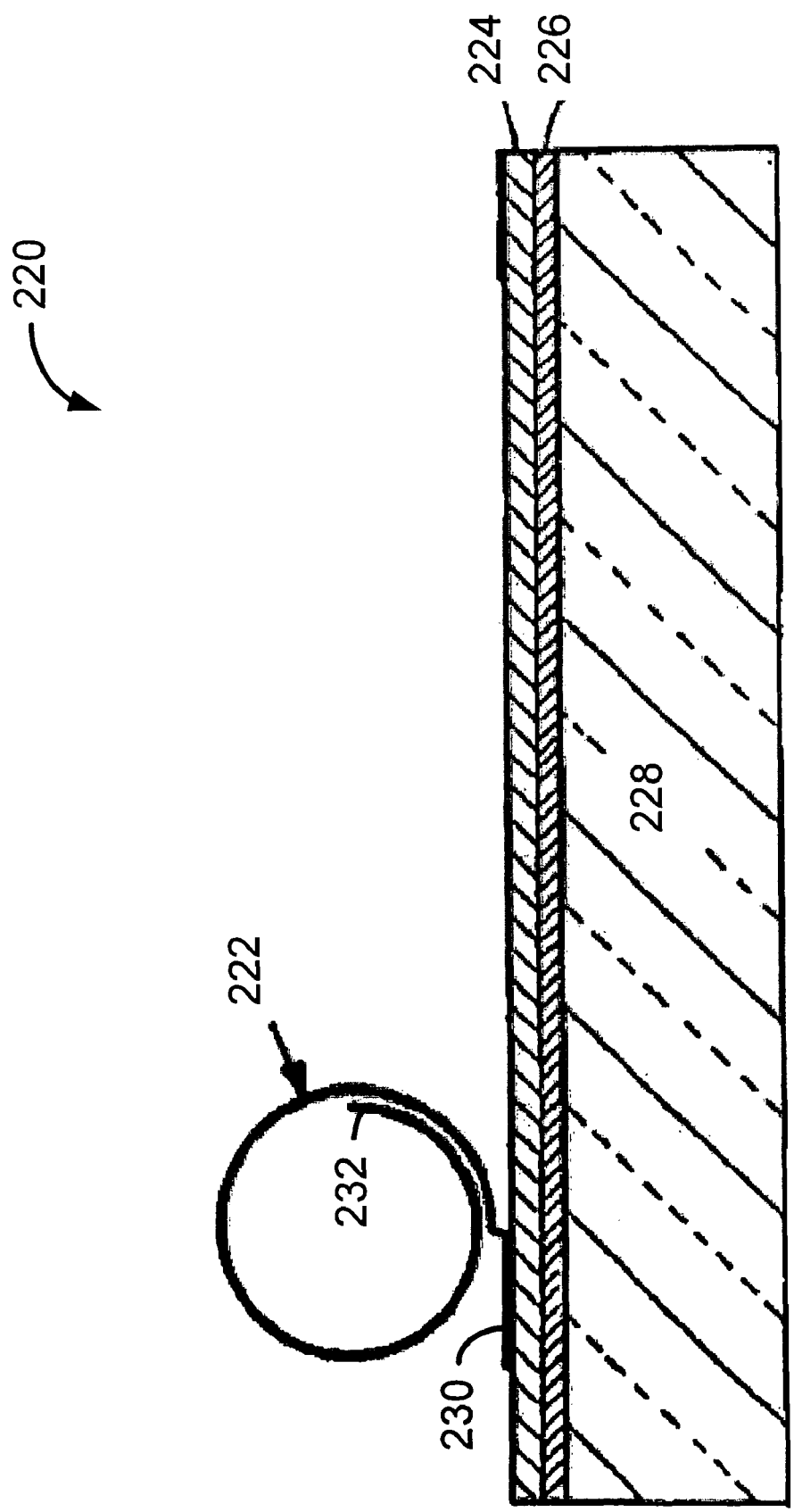

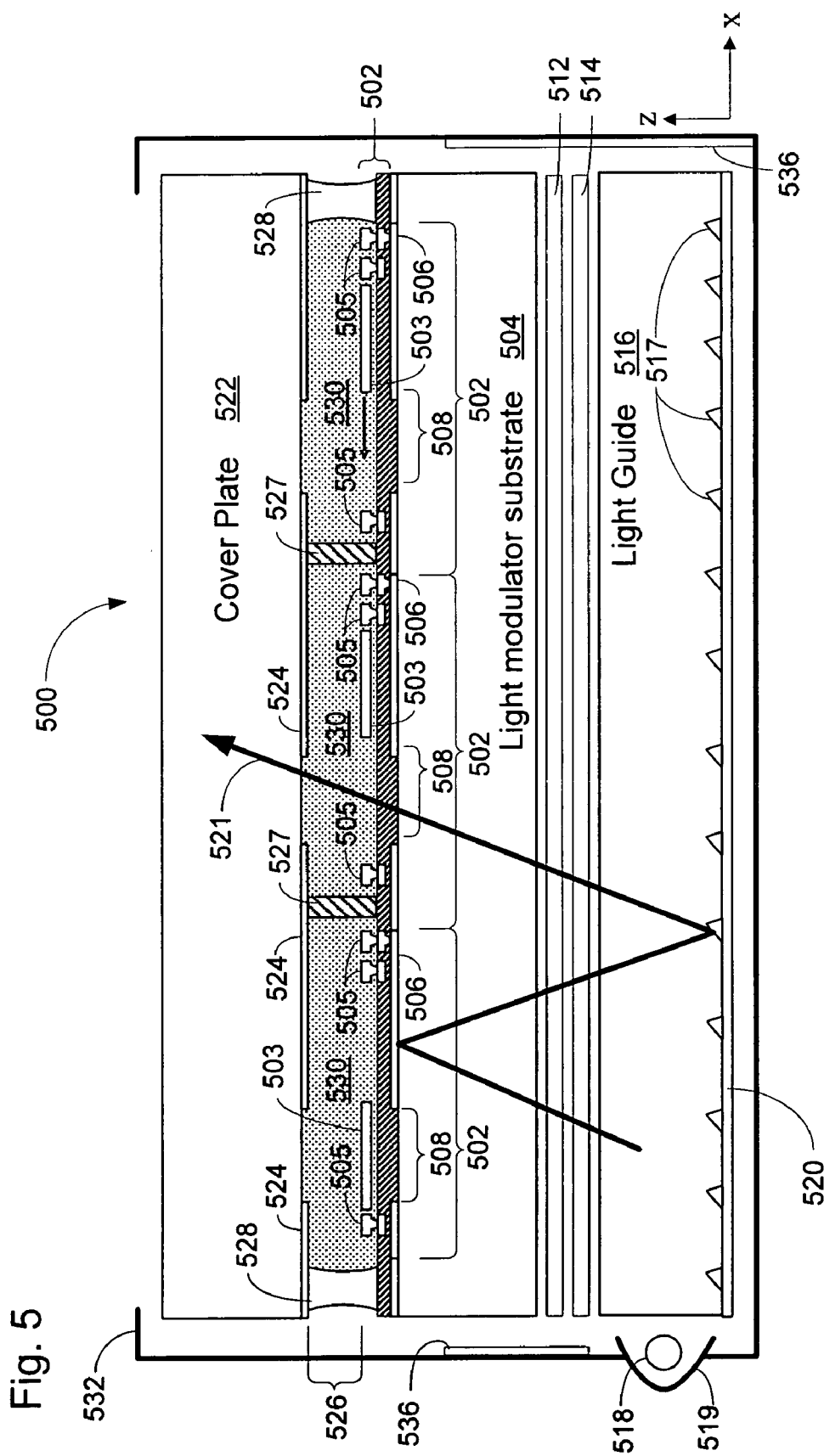

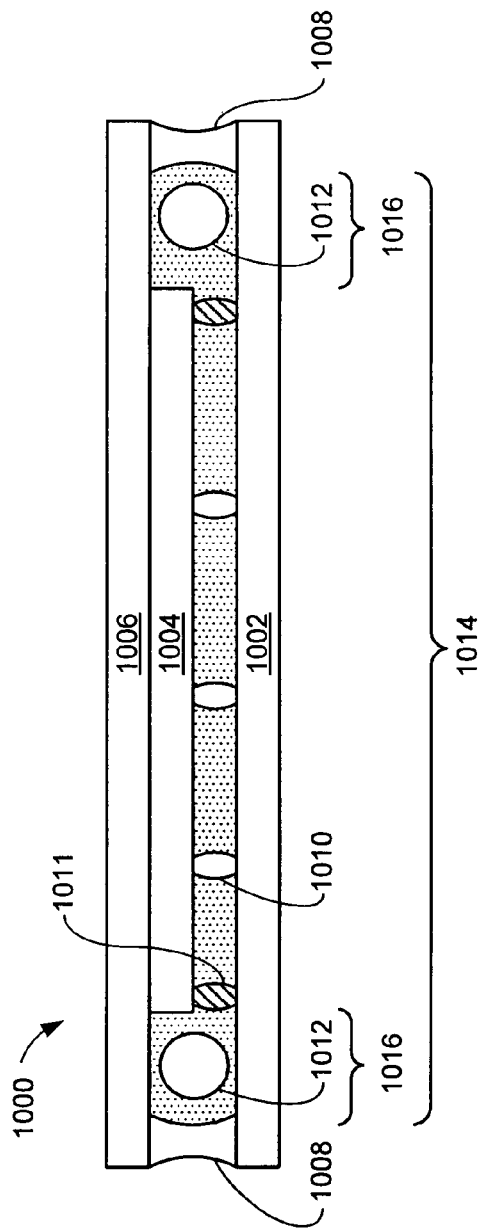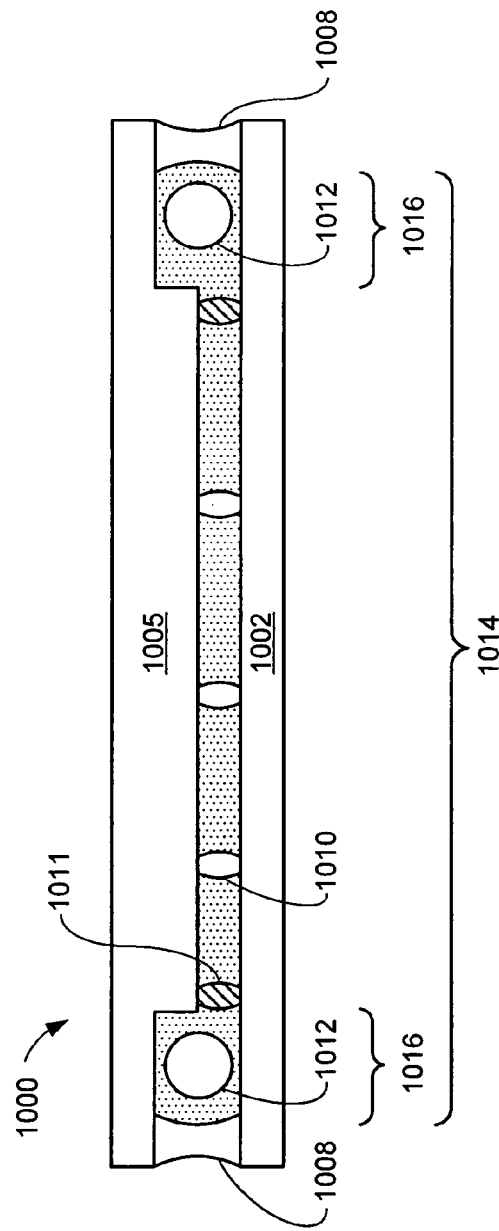
Figure 10A
Figure 10B

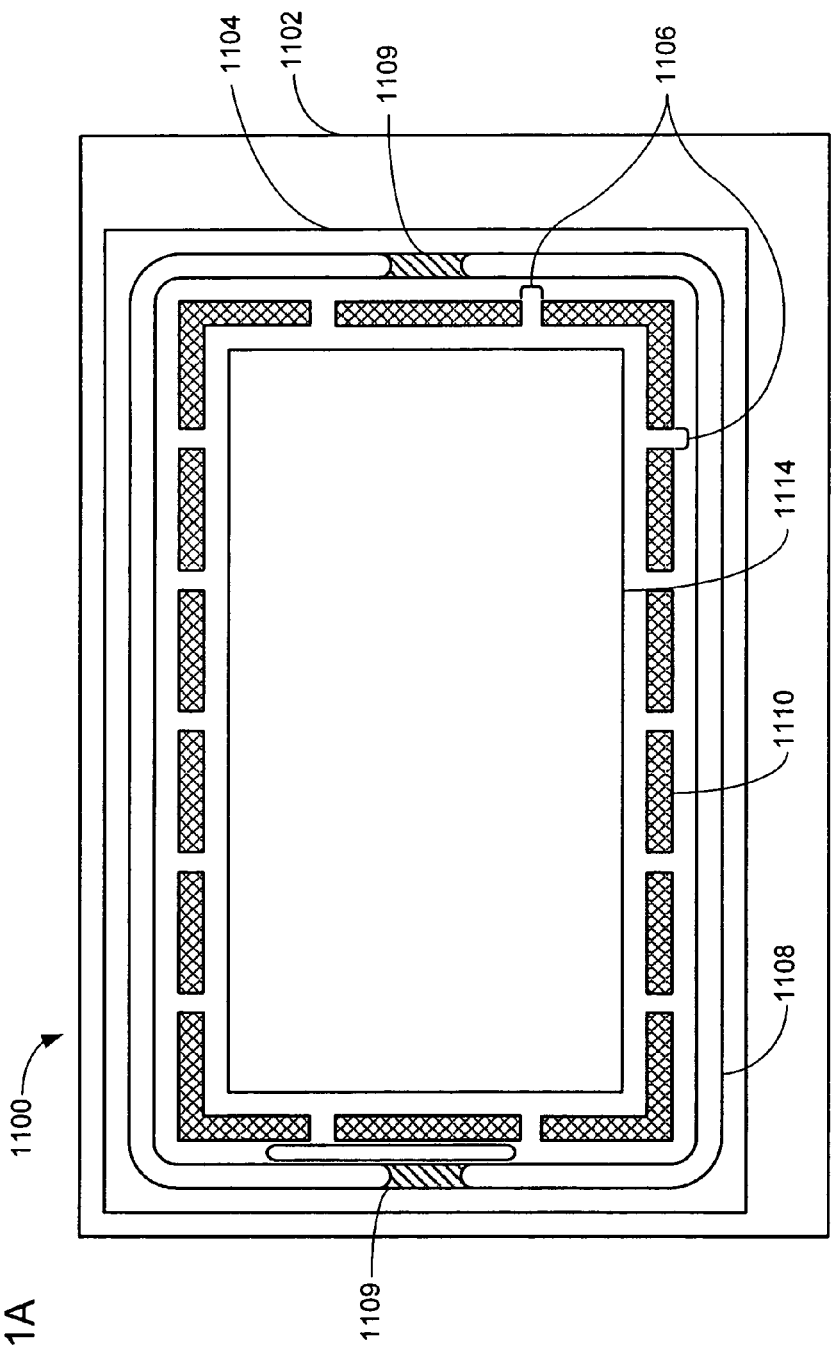
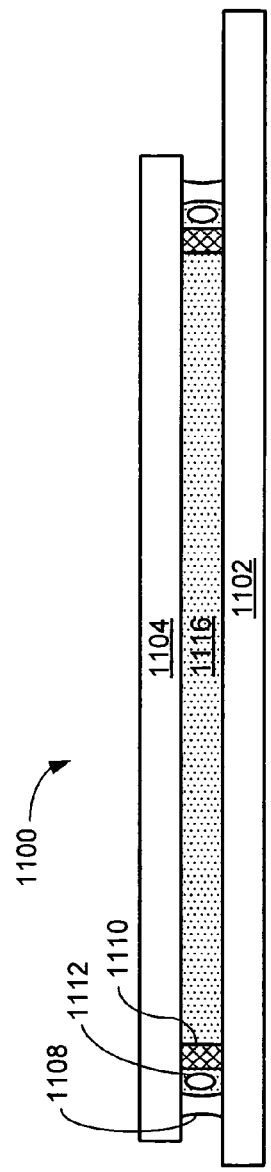
Figure 11A
Figure 11B

DISPLAY WITH CONTROLLED FORMATION OF BUBBLES

FIELD OF THE INVENTION

The present invention generally relates to the field of displays, such as imaging and projection displays. In particular, the invention relates to the assembly and operation of fluid filled display apparatuses.

DESCRIPTION OF THE RELATED ART

Displays built from mechanical light modulators are an attractive alternative to displays based on liquid crystal technology. Mechanical light modulators are fast enough to display video content with good viewing angles and with a wide range of color and grey scale. Direct-view displays using mechanical light modulators have not yet demonstrated sufficiently attractive combinations of brightness and low power. There is a need in the art for fast, bright, low-powered mechanically actuated direct-view displays. Specifically there is a need for direct-view displays that can be driven at high speeds and at low voltages for improved image quality and reduced power consumption.

Micro Electro-Mechanical Systems

Unlike liquid crystal displays, MEMS-based displays include hundreds, thousands, or in some cases, millions of moving elements. In some devices, every movement of an element provides an opportunity for static friction to disable one or more of the elements. This movement is facilitated by immersing all the parts in a working fluid (also referred to as fluid), usually one with a low coefficient of friction and minimal degradation effects over the long term.

Furthermore, because any working fluid used becomes part of the optical path of the device (and hence integral to its optical quality), the smallest changes in the state of the working fluid may have detrimental effects to the look and operation of the device. The walls containing the fluid in a MEMS direct-view apparatus form part of the display. In fact, it is common for them to be the largest portions of MEMS direct displays. This forces the builders to limit the amount of pressure under which the working fluid operates. Too much pressure and the display substrate may bulge in the center, affecting its optical qualities. At the other extreme, too low internal pressure will cause the fluid to boil if the working fluid is a liquid, thus forming bubbles. As a result, too high or too low internal pressures are to be avoided.

When the working fluid is a liquid such as oil, gas bubbles may form from two primary sources. The first is air that may have been trapped during the manufacturing or leaked in through the seals; the second is oil vapor, created by a low pressure situation. In effect, as the temperature drops, the oil contracts at a rate different to that of the substrates forming the enclosure. When this happens, and no prior bubbles are present, one or more bubbles re-crystallize suddenly in multiple locations of the display. When these bubbles are formed within the optical portion that the user looks at, they become an annoyance, usually leading to the replacement of the device.

A need exists in the art to be able to regulate display internal pressure and to control both the formation of display bubbles, as well as their location within the display, so that if they are formed, they do so within the portion of the display that is not in the user's optical path.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The invention is directed toward displays that incorporate liquid components in the display assembly. In some displays, the liquid performs a central role in the display operation, as in liquid crystal displays or in MEMS-based electrowetting displays. In other displays the liquid plays a facilitating role as a dielectric or as a lubricating medium, as can be the case with shutter-based MEMS displays. For certain designs, display performance is enhanced when the liquids are selected or formulated for low viscosities, preferably with viscosities below 70 centipoise. Liquids with viscosities below 70 centipoise often include materials with low molecular weights: below 4000 grams/mole, or in some cases below 400 grams/mole. A problem arises, then, because liquids incorporating materials with relatively low molecular weight can simultaneously display properties of low surface tension and/or high vapor pressure. Low surface tensions and/or high vapor pressures then contribute to the spontaneous formation of bubbles within a display area during operation, such bubbles being unacceptable to the display user.

In other embodiments the invention is directed toward displays that, either due to the selection of liquid or due to the method of manufacture, are expected to be assembled and operated in a condition where the liquid comprises at least one bubble permanently sealed into the assembly of the display. To facilitate the growth and/or dimensional change of this bubble during display operation a bubble trapping region is formed on the majority of one side or edge of the display and preferably outside of the active display area.

In one embodiment of the invention, these take the form of one or more bubble trapping regions within one or both substrates. The volume of each bubble trapping region may be larger or equal to the volume of the expected bubble (the size of the bubbles are a function of the working fluid volume and the expected temperature ranges). In another embodiment, the bubble trapping region may be larger, taking the form of a rectangular cavity (such as a trench) carved around either portions or the total periphery of one or both substrates. In another embodiment, the bubble trapping region may take the form of a space (such as a shelf) formed around the majority of one side. In another embodiment, the bubble trapping region is created by fencing the bubble away from the more valuable portions of the display. In all such forms, the bubble trapping regions allow for the movement of the bubble within it as the display is tilted when used, stored and/or transported by the user.

The invention relates to display apparatuses having an array of pixels, a substrate, a fluid, and a control matrix formed on the substrate. The array may include light modulators that each correspond to pixels in the array. The substrate may be transparent. The control matrix may have at least one switch, such as a thin film transistor, corresponding to each pixel in the array. In one embodiment of the invention, a display apparatus is formed by the combination of an aperture substrate and a modulation substrate, in combination with ancillary electronics and other mechanical features. This is described in detail in Hagood, et al (U.S. application Ser. No. 11/975,397), incorporated herein by reference.

As described, under certain conditions the formation of bubbles within the display working fluid cannot be avoided. As stated before, under the right conditions, multiple bubbles will form in the working fluid simultaneously. However, if at least one bubble is already present, no other bubbles will form in the fluid, instead the existing bubble will grow. Thus, if a seed bubble is provided within the working fluid volume, and is maintained throughout its storage and operating temperature range, no other bubbles will form.

According to one aspect of the invention, specific physical features within the display structure are created before alignment and enjoinment of the substrates in order to guarantee the location within which bubbles form and become contained.

Creating each of the above bubble trapping region may be accomplished via a variety of methods. These may include any that would remove material in the desired shape. These include acid etching, laser etching, spark-cutting, plasma etching, mechanical drilling or sawing, sandblasting and others.

Another embodiment may obviate the excavation of the trench, and instead build walls through the MEMS process, so as to build structures that could be used to create a corral for the bubble. That way, a long trough may be built as a bubble trapping region. Another embodiment may create the bubble trapping region by the creation of a space or shelf. In another embodiment, the bubble trapping region may be created by a wall of spacers which contain any bubble in the bubble trapping region.

According to another aspect of the invention, the aforementioned features would be endowed with a seed bubble during the manufacturing and assembly process, as described herein. In another embodiment, the features may be filled with a substance or material which would spontaneously or under other forces cause the formation of the seed bubble. Some of these may include spheres filled with gas, which may be released when broken by energy.

In another embodiment, a combination substance and assembly step may cause the formation of the seed bubble within the bubble trapping region. This could be accomplished, among others, by intentionally raising the fluid temperature during assembly.

Other features and advantages of the present invention will become apparent upon examining the following detailed description of an embodiment thereof, taken in conjunction with the attached drawings.

BRIEF DESCRIPTION OF THE DRAWINGS

The foregoing discussion will be understood more readily from the following detailed description of the invention with reference to the following drawings:

FIG. 2B is a cross-sectional view of a rollershade-based light modulator suitable for incorporation into the MEMS-based display of FIG. 1A, according to an illustrative embodiment of the invention;

FIG. 5 is a cross-sectional view of a shutter-based display apparatus, according to an illustrative embodiment of the invention;

FIG. 10A and 10B are views of an assembled panel illustrating potential bubble trapping region locations formed by the geometric matching of substrates;

FIGS. 11A and 11B are top views of an assembled panel illustrating spacers wall bubble trapping region configurations;

DETAILED DESCRIPTION OF THE DRAWINGS

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1A:
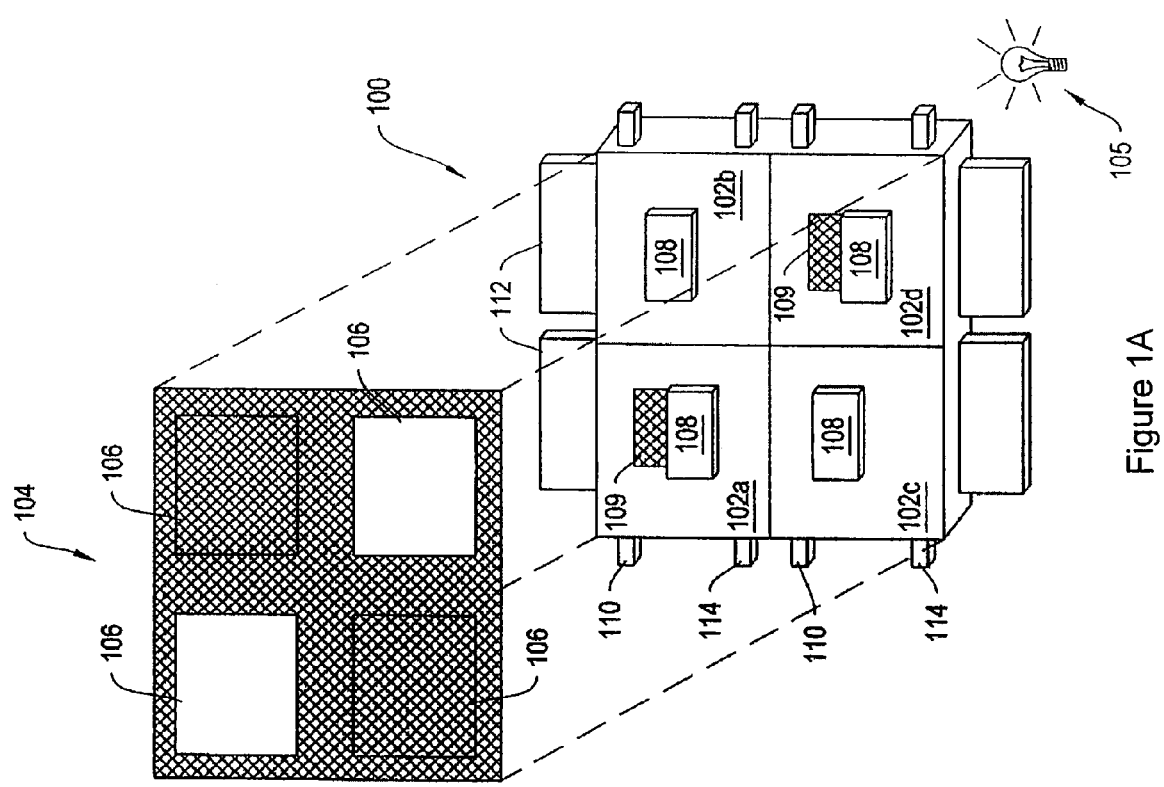
FIG. 1A is an isometric view of display apparatus, according to an illustrative embodiment of the invention.

FIG. 1A is a schematic diagram of a direct-view MEMS-based display apparatus 100, according to an illustrative embodiment of the invention. The display apparatus 100 includes a plurality of light modulators 102a-102d (generally "light modulators 102") arranged in rows and columns. In the display apparatus 100, light modulators 102a and 102d are in the open state, allowing light to pass. Light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e. by use of a frontlight. In one of the closed or open states, the light modulators 102 interfere with light in an optical path by, for example, and without limitation, blocking, reflecting, absorbing, filtering, polarizing, diffracting, or otherwise altering a property or path of the light.

In the display apparatus 100, each light modulator 102 corresponds to a pixel 106 in the image 104. In other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide grayscale in an image 104. With respect to an image, a "pixel" corresponds to the smallest picture element defined by the resolution of the image. With respect to structural components of the display apparatus 100, the term "pixel" refers to the combined mechanical and electrical components utilized to modulate the light that forms a single pixel of the image.

Display apparatus 100 is a direct-view display in that it does not require imaging optics. The user sees an image by looking directly at the display apparatus 100. In alternate embodiments the display apparatus 100 is incorporated into a projection display. In such embodiments, the display forms an image by projecting light onto a screen or onto a wall. In projection applications the display apparatus 100 is substantially smaller than the projected image 104.

Direct-view displays may operate in either a transmissive or reflective mode. In a transmissive display, the light modulators filter or selectively block light which originates from a lamp or lamps positioned behind the display. The light from the lamps is optionally injected into a light guide or "backlight". Transmissive direct-view display embodiments are often built onto transparent or glass substrates to facilitate a sandwich assembly arrangement where one substrate, containing the light modulators, is positioned directly on top of the backlight. In some transmissive display embodiments, a color-specific light modulator is created by associating a color filter material with each modulator 102. In other transmissive display embodiments colors can be generated, as described below, using a field sequential color method by alternating illumination of lamps with different primary colors.

Each light modulator 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material.

The display apparatus also includes a control matrix connected to the substrate and to the light modulators for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
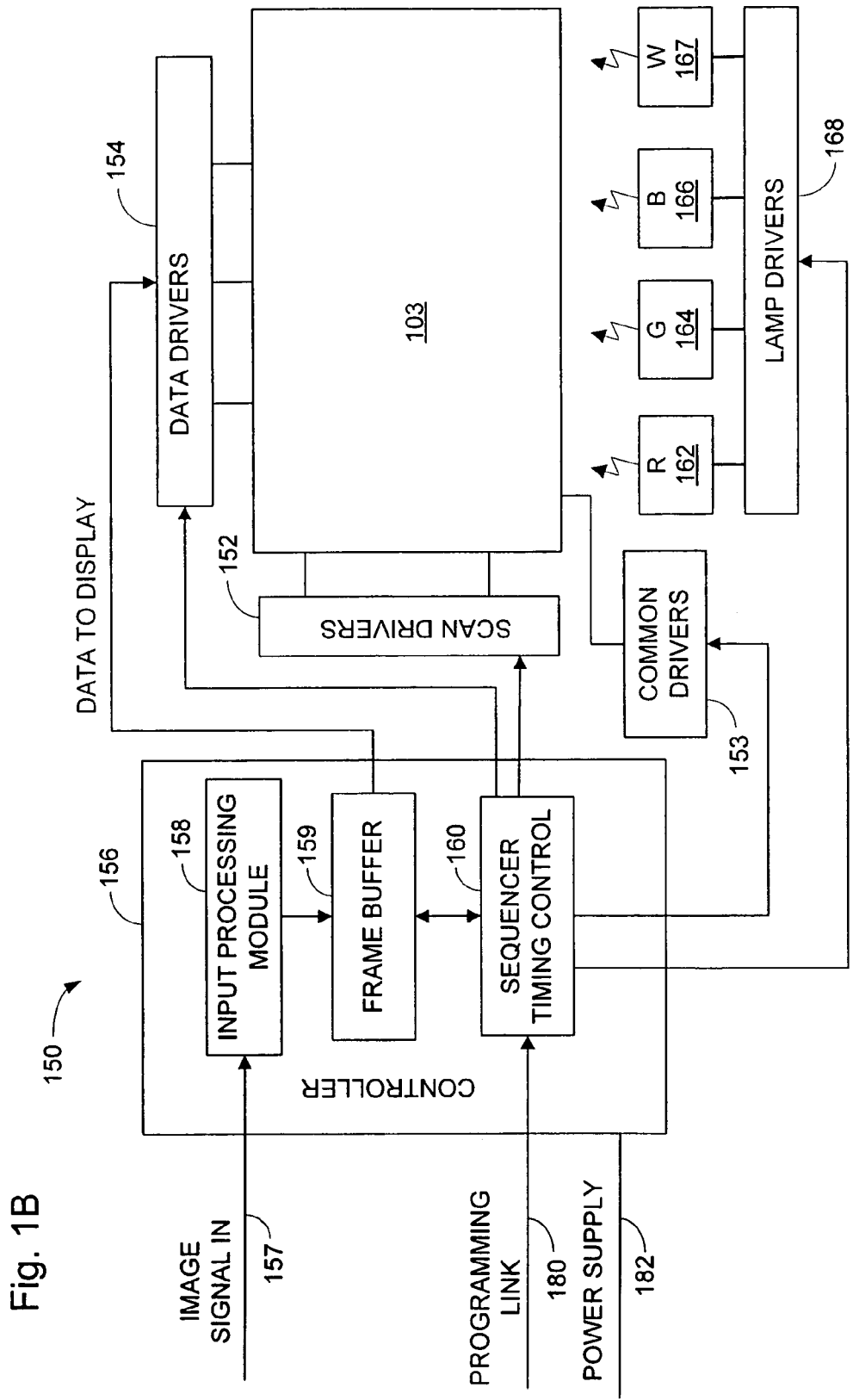
FIG. 1B is a block diagram of the display apparatus of FIG. 1A, according to an illustrative embodiment of the invention.

FIG. 1B is a block diagram 150 of the display apparatus 100. Referring to FIGS. 1A and 1B, in addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some embodiments of the display apparatus, the data drivers 154 are configured to provide analog data voltages to the light modulators, especially where the gray scale of the image 104 is to be derived in analog fashion. In analog operation the light modulators 102 are designed such that when a range of intermediate voltages is applied through the data interconnects 112 there results a range of intermediate open states in the shutters 108 and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller 156 includes an input processing module 158, which processes an incoming image signal 157 into a digital image format appropriate to the spatial addressing and the gray scale capabilities of the display 100. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

The display 100 apparatus optionally includes a set of common drivers 153, also referred to as common voltage sources. In some embodiments the common drivers 153 provide a DC common potential to all light modulators within the array of light modulators 103, for instance by supplying voltage to a series of common interconnects 114. In other embodiments the common drivers 153, following commands from the controller 156, issue voltage pulses or signals to the array of light modulators 103, for instance global actuation pulses which are capable of driving and/or initiating simultaneous actuation of all light modulators in multiple rows and columns of the array 103.

All of the drivers (e.g., scan drivers 152, data drivers 154, and common drivers 153) for different display functions are time-synchronized by a timing-control module 160 in the controller 156. Timing commands from the module 160 coordinate the illumination of red, green and blue and white lamps (162, 164, 166, and 167 respectively) via lamp drivers 168, the write-enabling and sequencing of specific rows within the array of pixels 103, the output of voltages from the data drivers 154, and the output of voltages that provide for light modulator actuation.

The controller 156 determines the sequencing or addressing scheme by which each of the shutters 108 in the array 103 can be re-set to the illumination levels appropriate to a new image 104. Details of suitable addressing, image formation, and gray scale techniques can be found in U.S. patent application Ser. Nos. 11/326,696 and 11/643,042, the entireties of which are incorporated herein by reference. New images 104 can be set at periodic intervals. For instance, for video displays, the color images 104 or frames of video are refreshed at frequencies ranging from 10 to 300 Hertz. In some embodiments the setting of an image frame to the array 103 is synchronized with the illumination of the lamps 162, 164, and 166 such that alternate image frames are illuminated with an alternating series of colors, such as red, green, and blue. The image frames for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 156 determines the addressing sequence and/or the time intervals between image frames to produce images 104 with appropriate gray scale. The process of generating varying levels of grayscale by controlling the amount of time a shutter 108 is open in a particular frame is referred to as time division gray scale. In one embodiment of time division gray scale, the controller 156 determines the time period or the fraction of time within each frame that a shutter 108 is allowed to remain in the open state, according to the illumination level or gray scale desired of that pixel. In other implementations, for each image frame, the controller 156 sets a plurality of sub-frame images in multiple rows and columns of the array 103, and the controller alters the duration over which each sub-frame image is illuminated in proportion to a gray scale value or significance value employed within a coded word for gray scale. For instance, the illumination times for a series of sub-frame images can be varied in proportion to the binary coding series 1,2,4,8 . . . . The shutters 108 for each pixel in the array 103 are then set to either the open or closed state within a sub-frame image according to the value at a corresponding position within the pixel's binary coded word for gray level.

In other implementations, the controller alters the intensity of light from the lamps 162, 164, and 166 in proportion to the gray scale value desired for a particular sub-frame image. A number of hybrid techniques are also available for forming colors and gray scale from an array of shutters 108. For instance, the time division techniques described above can be combined with the use of multiple shutters 108 per pixel, or the gray scale value for a particular sub-frame image can be established through a combination of both sub-frame timing and lamp intensity. Details of these and other embodiments can be found in U.S. patent application Ser. No. 11/643,042, referenced above.

In some implementations the data for an image state 104 is loaded by the controller 156 to the modulator array 103 by a sequential addressing of individual rows, also referred to as scan lines. For each row or scan line in the sequence, the scan driver 152 applies a write-enable voltage to the write enable interconnect 110 for that row of the array 103, and subsequently the data driver 154 supplies data voltages, corresponding to desired shutter states, for each column in the selected row. This process repeats until data has been loaded for all rows in the array. In some implementations the sequence of selected rows for data loading is linear, proceeding from top to bottom in the array. In other implementations the sequence of selected rows is pseudo-randomized, in order to minimize visual artifacts. And in other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array 103 is separated in time from the process of actuating the shutters 108. In these implementations, the modulator array 103 may include data memory elements for each pixel in the array 103 and the control matrix may include a global actuation interconnect for carrying trigger signals, from common driver 153, to initiate simultaneous actuation of shutters 108 according to data stored in the memory elements. Various addressing sequences, many of which are described in U.S. patent application Ser. No. 11/643,042, can be coordinated by means of the timing control module 160.

In alternative embodiments, the array of pixels 103 and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The display 100 is comprised of a plurality of functional blocks including the timing control module 160, the frame buffer 159, scan drivers 152, data drivers 154, and drivers 153 and 168. Each block can be understood to represent either a distinguishable hardware circuit and/or a module of executable code. In some implementations the functional blocks are provided as distinct chips or circuits connected together by means of circuit boards and/or cables. Alternately, many of these circuits can be fabricated along with the pixel array 103 on the same substrate of glass or plastic. In other implementations, multiple circuits, drivers, processors, and/or control functions from block diagram 150 may be integrated together within a single silicon chip, which is then bonded directly to the transparent substrate holding pixel array 103.

The controller 156 includes a programming link 180 by which the addressing, color, and/or gray scale algorithms, which are implemented within controller 156, can be altered according to the needs of particular applications. In some embodiments, the programming link 180 conveys information from environmental sensors, such as ambient light or temperature sensors, so that the controller 156 can adjust imaging modes or backlight power in correspondence with environmental conditions. The controller 156 also comprises a power supply input 182 which provides the power needed for lamps as well as light modulator actuation. Where necessary, the drivers 152, 153, 154, and/or 168 may include or be associated with DC-DC converters for transforming an input voltage at 182 into various voltages sufficient for the actuation of shutters 108 or illumination of the lamps, such as lamps 162, 164, 166, and 167.

MEMS Light Modulators

Figure 2A:
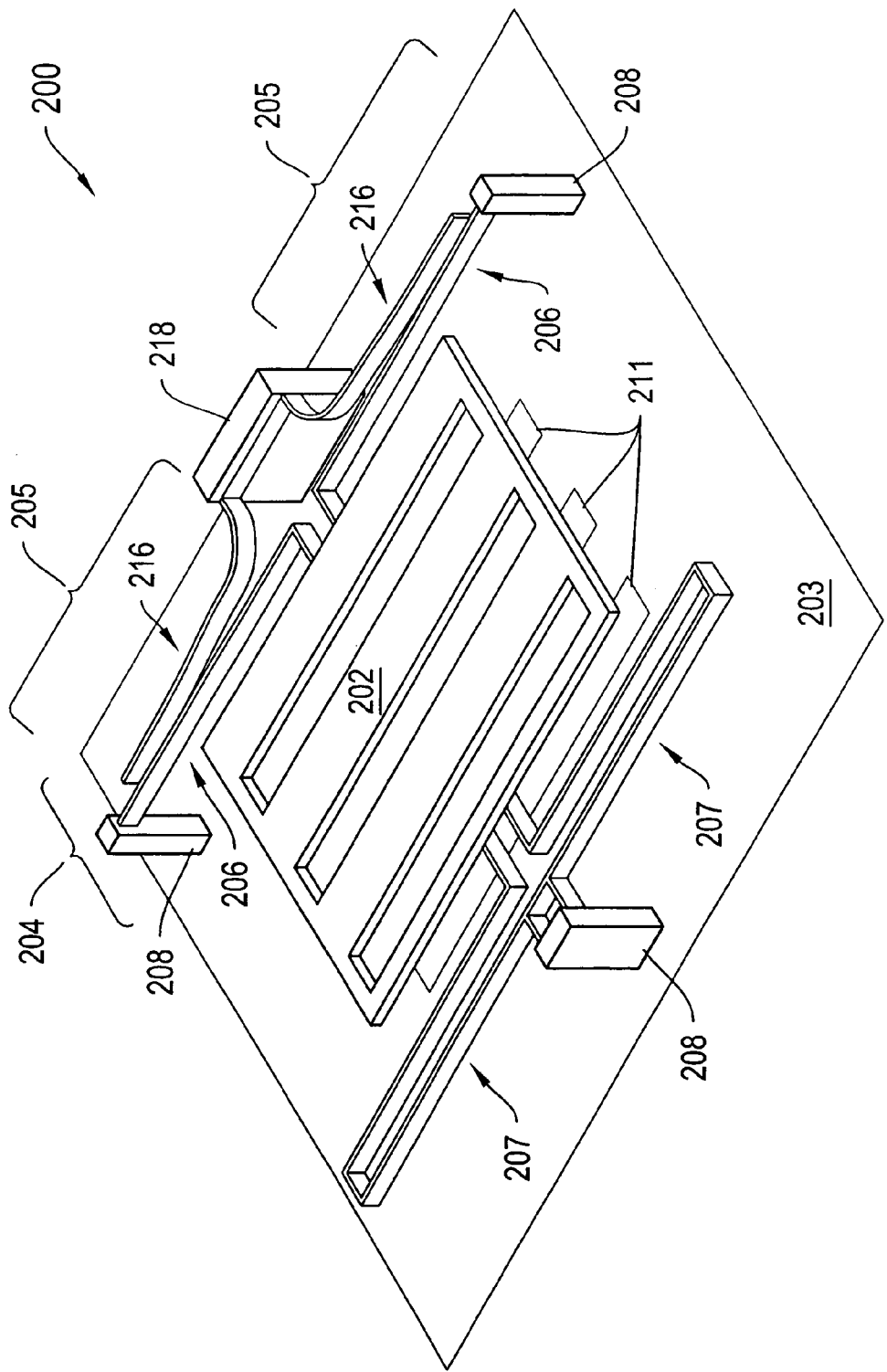
FIG. 2A is a perspective view of an illustrative shutter-based light modulator suitable for incorporation into the MEMS-based display of FIG. 1A, according to an illustrative embodiment of the invention.

FIG. 2A is a perspective view of an illustrative shutter-based light modulator 200 suitable for incorporation into the MEMS-based display apparatus 100 of FIG. 1A, according to an illustrative embodiment of the invention. The shutter-based light modulator 200 (also referred to as shutter assembly 200) includes a shutter 202 coupled to an actuator 204. The actuator 204 is formed from two separate compliant electrode beam actuators 205 (the "actuators 205"), as described in U.S. patent application Ser. No. 11/251,035, filed on Oct. 14, 2005, now U.S. Pat. No. 7,271,945. The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The load anchors 208 physically connect the compliant load beams 206 and the shutter 202 to the surface 203 and electrically connect the load beams 206 to a bias voltage, in some instances, ground.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

The surface 203 includes one or more apertures 211 for admitting the passage of light. If the shutter assembly 200 is formed on an opaque substrate, made for example from silicon, then the surface 203 is a surface of the substrate, and the apertures 211 are formed by etching an array of holes through the substrate. If the shutter assembly 200 is formed on a transparent substrate, made for example of glass or plastic, then the surface 203 is a surface of a light blocking layer deposited on the substrate, and the apertures are formed by etching the surface 203 into an array of holes 211. The apertures 211 can be generally circular, elliptical, polygonal, serpentine, or irregular in shape.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 is removed, the load beams 206 push the shutter 202 back into its initial position, releasing the stress stored in the load beams 206.

The shutter assembly 200, also referred to as an elastic shutter assembly, incorporates a passive restoring force, such as a spring, for returning a shutter to its rest or relaxed position after voltages have been removed. A number of elastic restore mechanisms and various electrostatic couplings can be designed into or in conjunction with electrostatic actuators, the compliant beams illustrated in shutter assembly 200 being just one example. Other examples are described in U.S. patent applications Ser. Nos. 11/251,035 and 11/326,696, the entireties of which are incorporated herein by reference. For instance, a highly non-linear voltage-displacement response can be provided which favors an abrupt transition between "open" vs. "closed" states of operation, and which, in many cases, provides a bi-stable or hysteretic operating characteristic for the shutter assembly. Other electrostatic actuators can be designed with more incremental voltage-displacement responses and with considerably reduced hysteresis, as may be preferred for analog gray scale operation.

The actuator 205 within the elastic shutter assembly is said to operate between a closed or actuated position and a relaxed position. The designer, however, can choose to place apertures 211 such that shutter assembly 200 is in either the "open" state, i.e. passing light, or in the "closed" state, i.e. blocking light, whenever actuator 205 is in its relaxed position. For illustrative purposes, it is assumed below that elastic shutter assemblies described herein are designed to be open in their relaxed state.

In many cases it is preferable to provide a dual set of "open" and "closed" actuators as part of a shutter assembly so that the control electronics are capable of electrostatically driving the shutters into each of the open and closed states.

Display apparatus 100, in alternative embodiments, includes light modulators other than transverse shutter-based light modulators, such as the shutter assembly 200 described above. For example, FIG. 2B is a cross-sectional view of a rolling actuator shutter-based light modulator 220 suitable for incorporation into an alternative embodiment of the MEMS-based display apparatus 100 of FIG. 1A, according to an illustrative embodiment of the invention. As described further in U.S. Pat. No. 5,233,459, entitled "Electric Display Device," and U.S. Pat. No. 5,784,189, entitled "Spatial Light Modulator," the entireties of which are incorporated herein by reference, a rolling actuator-based light modulator includes a moveable electrode disposed opposite a fixed electrode and biased to move in a preferred direction to produce a shutter upon application of an electric field. In one embodiment, the light modulator 220 includes a planar electrode 226 disposed between a substrate 228 and an insulating layer 224 and a moveable electrode 222 having a fixed end 230 attached to the insulating layer 224. In the absence of any applied voltage, a moveable end 232 of the moveable electrode 222 is free to roll towards the fixed end 230 to produce a rolled state. Application of a voltage between the electrodes 222 and 226 causes the moveable electrode 222 to unroll and lie flat against the insulating layer 224, whereby it acts as a shutter that blocks light traveling through the substrate 228. The moveable electrode 222 returns to the rolled state by means of an elastic restoring force after the voltage is removed. The bias towards a rolled state may be achieved by manufacturing the moveable electrode 222 to include an anisotropic stress state.

Figure 2C:
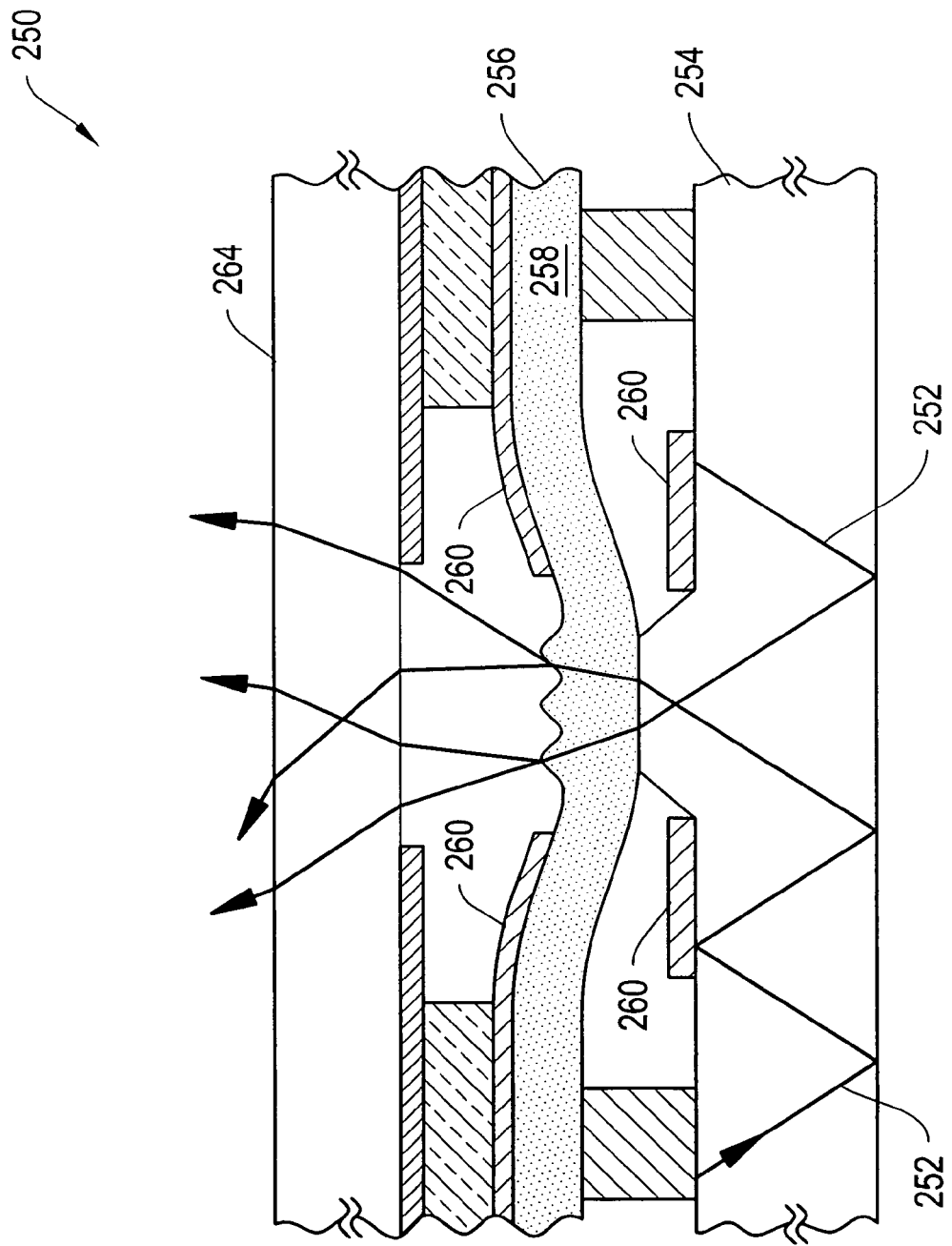
FIG. 2C is a cross sectional view of a light-tap-based light modulator suitable for incorporation into an alternative embodiment of the MEMS-based display of FIG. 1A, according to an illustrative embodiment of the invention.

FIG. 2C is a cross-sectional view of an illustrative non shutter-based MEMS light modulator 250. The light tap modulator 250 is suitable for incorporation into an alternative embodiment of the MEMS-based display apparatus 100 of FIG. 1A, according to an illustrative embodiment of the invention. As described further in U.S. Pat. No. 5,771,321, entitled "Micromechanical Optical Switch and Flat Panel Display," the entirety of which is incorporated herein by reference, a light tap works according to a principle of frustrated total internal reflection. That is, light 252 is introduced into a light guide 254, in which, without interference, light 252 is for the most part unable to escape the light guide 254 through its front or rear surfaces due to total internal reflection. The light tap 250 includes a tap element 256 that has a sufficiently high index of refraction that, in response to the tap element 256 contacting the light guide 254, light 252 impinging on the surface of the light guide 254 adjacent the tap element 256 escapes the light guide 254 through the tap element 256 towards a viewer, thereby contributing to the formation of an image.

In one embodiment, the tap element 256 is formed as part of beam 258 of flexible, transparent material. Electrodes 260 coat portions of one side of the beam 258. Opposing electrodes 260 are disposed on the light guide 254. By applying a voltage across the electrodes 260, the position of the tap element 256 relative to the light guide 254 can be controlled to selectively extract light 252 from the light guide 254.

Figure 2D:
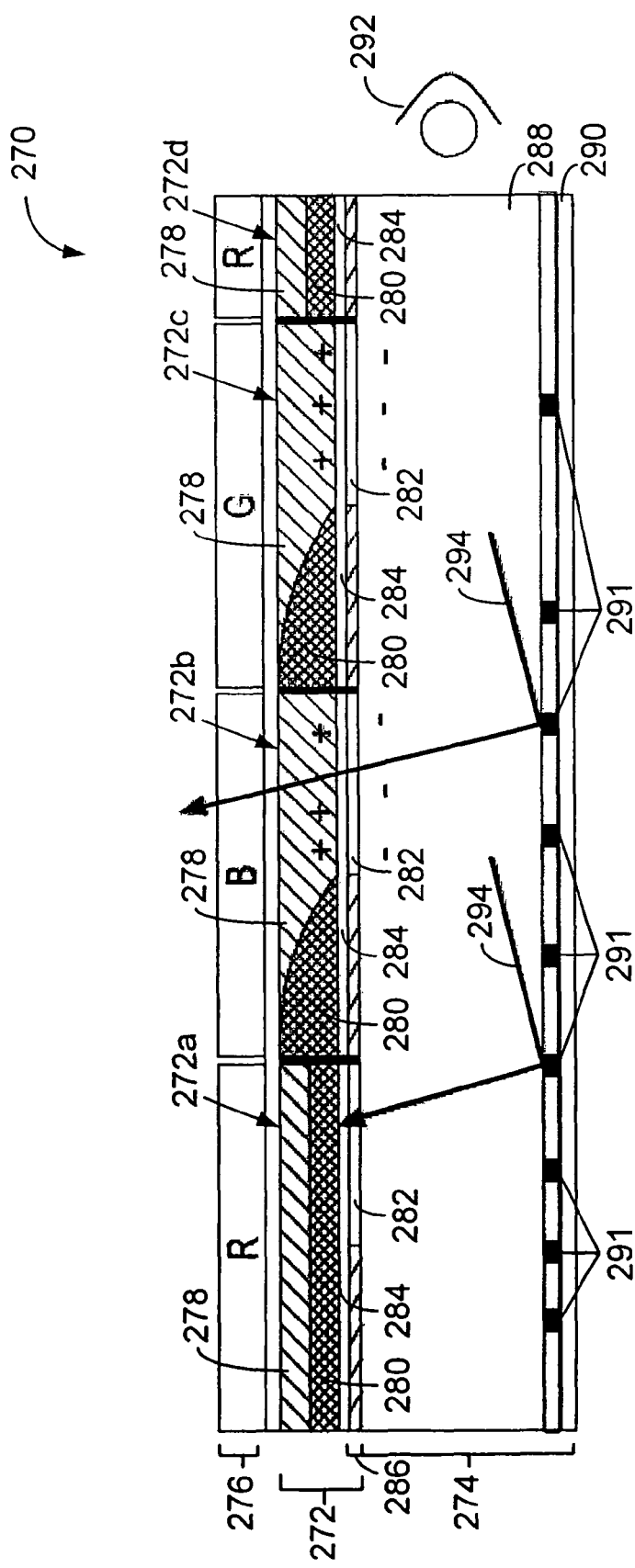
FIG. 2D is a cross sectional view of an electrowetting-based light modulator suitable for incorporation into an alternative embodiment of the MEMS-based display of FIG. 1A, according to an illustrative embodiment of the invention.

FIG. 2D is a cross sectional view of a second illustrative non-shutter-based MEMS light modulator suitable for inclusion in various embodiments of the invention. Specifically, FIG. 2D is a cross sectional view of an electrowetting-based light modulation array 270. The electrowetting-based light modulator array 270 is suitable for incorporation into an alternative embodiment of the MEMS-based display apparatus 100 of FIG. 1A, according to an illustrative embodiment of the invention. The light modulation array 270 includes a plurality of electrowetting-based light modulation cells 272a-272d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide) and an insulating layer 284 positioned between the layer of light absorbing oil 280 and the transparent electrode 282. Illustrative implementations of such cells are described further in U.S. Patent Application Publication No. 2005/0104804, published May 19, 2005 and entitled "Display Device," the entirety of which is incorporated herein by reference In the embodiment described herein, the electrode takes up a portion of a rear surface of a cell 272.

In order to increase switching speed, at least one of the two liquid components 278 and 280 in the electrowetting display should have a low viscosity, preferably less than 70 centipoise and more preferably less than 10 centipoise. Lower viscosities can be facilitated if at least one of the two liquid components includes materials having molecular weights less than 4000 grams/mole, preferably less than 400 grams/mole. Suitable low viscosity fluids include water, alcohols, fluorinated silicone oils, polydimethylsiloxane, hexamethyldisiloxane, octamethyltrisiloxance, octane, and diethylbenzene.

Suitable low viscosity non-polar oils include, without limitation, paraffins, olefins, ethers, silicone oils, fluorinated silicone oils, or other natural or synthetic solvents or lubricants. Useful oils can be polydimethylsiloxanes, such as hexamethyldisiloxane and octamethyltrisiloxane, or alkyl methyl siloxanes such as hexylpentamethyldisiloxane. Useful oils can be alkanes, such as octane or decane. Useful oils can be nitroalkanes, such as nitromethane. Useful oils can be aromatic compounds, such as toluene or diethylbenzene. Useful oils can be ketones, such as butanone or methyl isobutyl ketone. Useful oils can be chlorocarbons, such as chlorobenzene. And useful oils can be chlorofluorocarbons, such as dichlorofluoroethane or chlorotrifluoroethylene. The oils can be mixed with dyes to increase light absorption, either at specific colors such as cyan, magenta, and yellow, or over a broader spectrum to create a black ink.

For many embodiments it is useful to incorporate mixtures of the above oils. For instance mixtures of alkanes or mixtures of polydimethylsiloxanes can be useful where the mixture includes molecules with a range of molecular weights. One can also optimize properties by mixing fluids from different families or fluids with different properties. For instance, the surface wetting properties of a hexamethyldisiloxane and be combined with the low viscosity of butanone to create an improved fluid.

The light modulation array 270 also includes a light guide 288 and one or more light sources 292 which inject light 294 into the light guide 288. A series of light redirectors 291 are formed on the rear surface of the light guide, proximate a front facing reflective layer 290. The light redirectors 291 may be either diffuse or specular reflectors. The modulation array 270 includes an aperture layer 286 which is patterned into a series of apertures, one aperture for each of the cells 272, to allow light rays 294 to pass through the cells 272 and toward the viewer.

In one embodiment the aperture layer 286 is comprised of a light absorbing material to block the passage of light except through the patterned apertures. In another embodiment the aperture layer 286 is comprised of a reflective material which reflects light not passing through the surface apertures back towards the rear of the light guide 288. After returning to the light guide, the reflected light can be further recycled by the front facing reflective layer 290.

In operation, application of a voltage to the electrode 282 of a cell causes the light absorbing oil 280 in the cell to move into or collect in one portion of the cell 272. As a result, the light absorbing oil 280 no longer obstructs the passage of light through the aperture formed in the reflective aperture layer 286 (see, for example, cells 272b and 272c). Light escaping the light guide 288 at the aperture is then able to escape through the cell and through a corresponding color (for example, red, green, or blue) filter in the set of color filters 276 to form a color pixel in an image. When the electrode 282 is grounded, the light absorbing oil 280 returns to its previous position (as in cell 272a) and covers the aperture in the reflective aperture layer 286, absorbing any light 294 attempting to pass through it.

The roller-based light modulator 220, light tap 250, and electrowetting-based light modulation array 270 are not the only examples of MEMS light modulators suitable for inclusion in various embodiments of the invention. It will be understood that other MEMS light modulators can exist and can be usefully incorporated into the invention.

U.S. patent applications Ser. Nos. 11/251,035 and 11/326,696 have described a variety of methods by which an array of shutters can be controlled via a control matrix to produce images, in many cases moving images, with appropriate gray scale. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 3A:
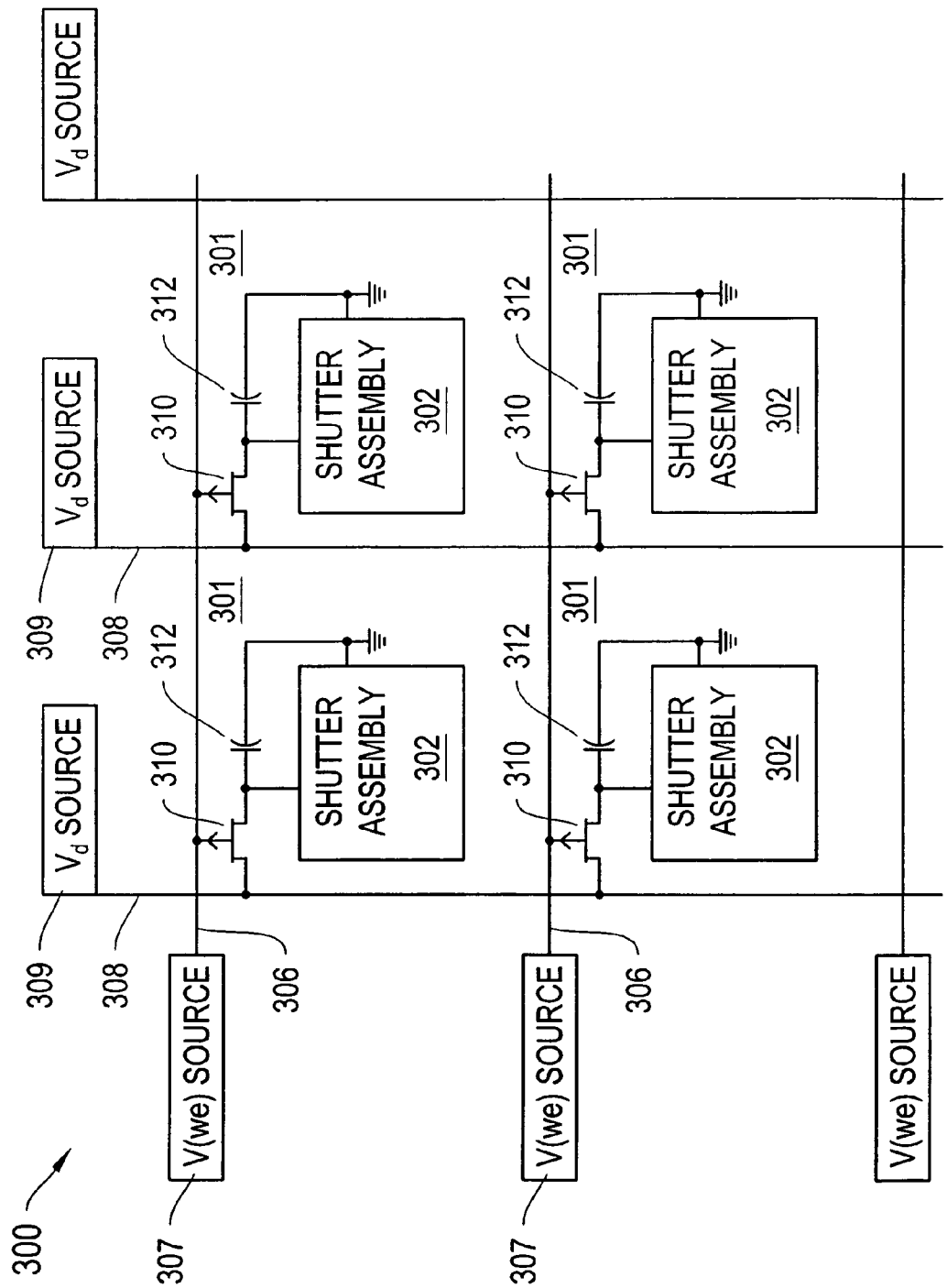
FIG. 3A is a schematic diagram of a control matrix suitable for controlling the light modulators incorporated into the MEMS-based display of FIG. 1A, according to an illustrative embodiment of the invention.
Figure 3B:
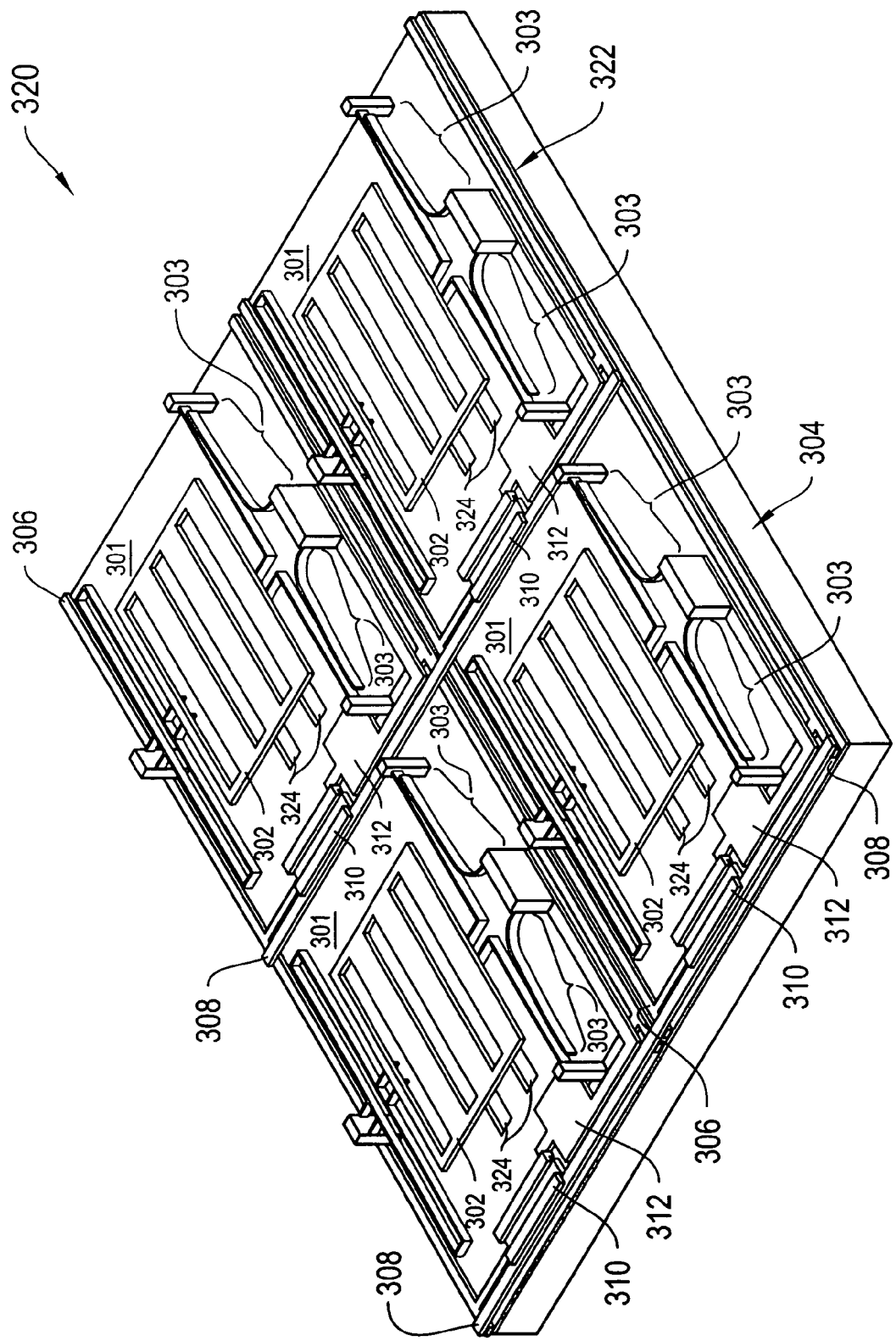
FIG. 3B is a perspective view of an array of shutter-based light modulators connected to the control matrix of FIG. 3A, according to an illustrative embodiment of the invention.

FIG. 3A is a schematic diagram of a control matrix 300 suitable for controlling the light modulators incorporated into the MEMS-based display apparatus 100 of FIG. 1A, according to an illustrative embodiment of the invention. FIG. 3B is a perspective view of an array 320 of shutter-based light modulators connected to the control matrix 300 of FIG. 3A, according to an illustrative embodiment of the invention. The control matrix 300 may address an array of pixels 320 (the "array 320"). Each pixel 301 includes an elastic shutter assembly 302, such as the shutter assembly 200 of FIG. 2A, controlled by an actuator 303. Each pixel also includes an aperture layer 322 that includes apertures 324. Further electrical and mechanical descriptions of shutter assemblies such as shutter assembly 302, and variations thereon, can be found in U.S. patent applications Ser. Nos. 11/251,035 and 11/326, 696. Descriptions of alternate control matrices can also be found in U.S. patent application Ser. No. 11/607,715, the entirety of which is incorporated herein by reference.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source, ("Vd source") 309 to the pixels 301 in a corresponding column of pixels 301. In control matrix 300, the data voltage $V_d$ provides the majority of the energy necessary for actuation of the shutter assemblies 302. Thus, the data voltage source 309 also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. It is not necessary, therefore, to wait and hold the voltage $V_{we}$ on a row for times long enough for the shutter assembly 302 to actuate; such actuation can proceed after the write-enabling voltage has been removed from the row. The capacitors 312 also function as memory elements within the array 320, storing actuation instructions for periods as long as is necessary for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In one implementation the substrate 304 is made of a transparent material, such as glass or plastic. In another implementation the substrate 304 is made of an opaque material, but in which holes are etched to form the apertures 324.

Components of shutter assemblies 302 are processed either at the same time as the control matrix 300 or in subsequent processing steps on the same substrate. The electrical components in control matrix 300 are fabricated using many thin film techniques in common with the manufacture of thin film transistor arrays for liquid crystal displays. Available techniques are described in Den Boer, Active Matrix Liquid Crystal Displays (Elsevier, Amsterdam, 2005), the entirety of which is incorporated herein by reference. The shutter assemblies are fabricated using techniques similar to the art of micromachining or from the manufacture of micromechanical (i.e., MEMS) devices. Many applicable thin film MEMS techniques are described in Rai-Choudhury, ed., Handbook of Microlithography, Micromachining & Microfabrication (SPIE Optical Engineering Press, Bellingham, Wash. 1997), the entirety of which is incorporated herein by reference. Fabrication techniques specific to MEMS light modulators formed on glass substrates can be found in U.S. patent application Ser. Nos. 11/361,785 and 11/731,628, now U.S. Pat. Nos. 7,405,852 and 7,675,665, respectively, the entireties of which are incorporated herein by reference. For instance, as described in those applications, the shutter assembly 302 can be formed from thin films of amorphous silicon, deposited by a chemical vapor deposition process.

The shutter assembly 302 together with the actuator 303 can be made bi-stable. That is, the shutters can exist in at least two equilibrium positions (e.g. open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 can also be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in shutter-based light modulator 200, or the opposing force may be exerted by an opposing actuator, such as an "open" or "closed" actuator.

The light modulator array 320 is depicted as having a single MEMS light modulator per pixel. Other embodiments are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

In other embodiments the roller-based light modulator 220, the light tap 250, or the electrowetting-based light modulation array 270, as well as other MEMS-based light modulators, can be substituted for the shutter assembly 302 within the light modulator array 320.

Figure 4A:
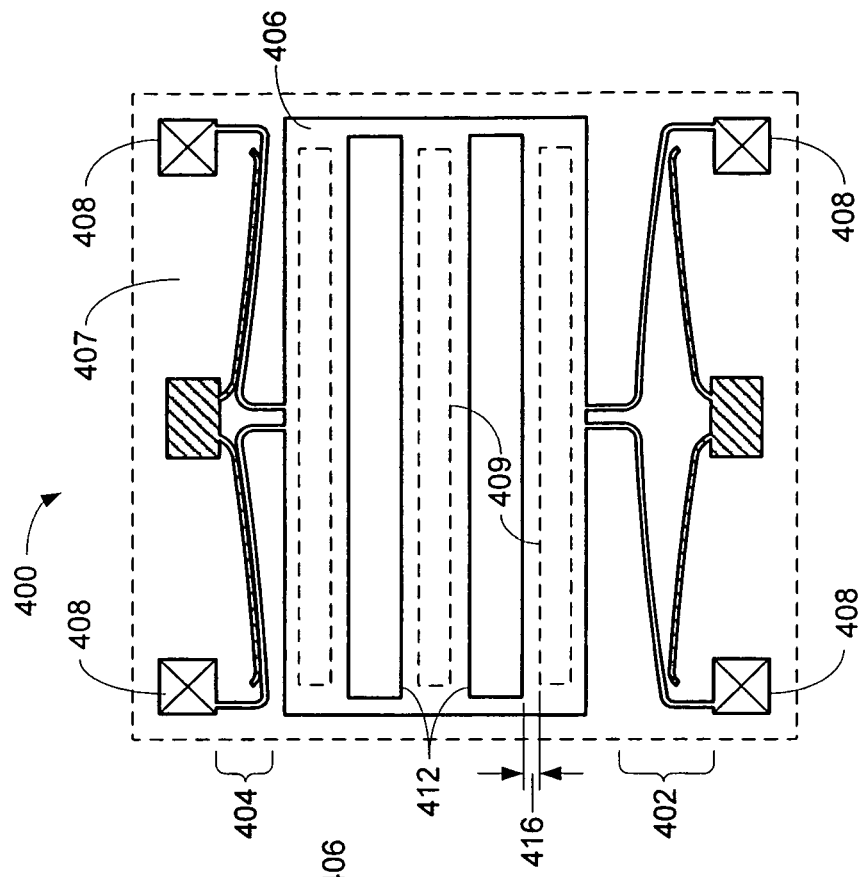
FIGS. 4A and 4B are plan views of a dual-actuated shutter assembly in the open and closed states respectively, according to an illustrative embodiment of the invention.
Figure 4B:
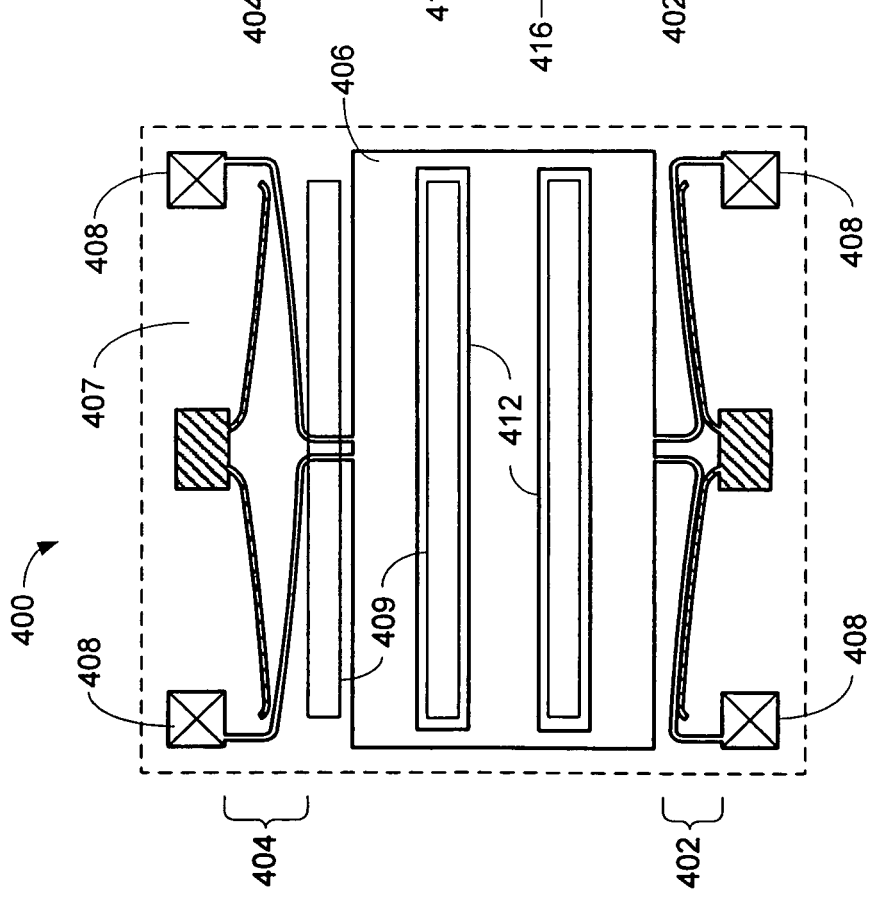

FIGS. 4A and 4B illustrate an alternative shutter-based light modulator (shutter assembly) 400 suitable for inclusion in various embodiments of the invention. The light modulator 400 is an example of a dual actuator shutter assembly, and is shown in FIG. 4A in an open state. FIG. 4B is a view of the dual actuator shutter assembly 400 in a closed state. Shutter assembly 400 is described in further detail in U.S. patent application Ser. No. 11/251,035, referenced above. In contrast to the shutter assembly 200, shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of apertures 412 and 409 coincide. In FIG. 4B the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (shown as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In other implementations the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$. A number of control matrices which take advantage of the bi-stable operation characteristic are described in U.S. patent application Ser. No. 11/607,715, referenced above.

FIG. 5 is a cross sectional view of a display apparatus 500 incorporating shutter-based light modulators (shutter assemblies) 502, according to an illustrative embodiment of the invention. Each shutter assembly incorporates a shutter 503 and an anchor 505. Not shown are the compliant beam actuators which, when connected between the anchors 505 and the shutters 503, help to suspend the shutters a short distance above the surface. The shutter assemblies 502 are disposed on a transparent substrate 504, preferably made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition. In another implementation, the rear-facing reflective layer 506 can be formed from a mirror, such as a dielectric mirror. A dielectric mirror is fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 shown in FIG. 4B.

The display apparatus 500 includes an optional diffuser 512 and/or an optional brightness enhancing film 514 which separate the substrate 504 from a planar light guide 516. The light guide is comprised of a transparent, i.e. glass or plastic material. The light guide 516 is illuminated by one or more light sources 518, forming a backlight. The light sources 518 can be, for example, and without limitation, incandescent lamps, fluorescent lamps, lasers, or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion light that fails to leave the display to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light re-directors can be molded into the plastic body of light guide 516 with shapes that can be alternately triangular, trapezoidal, or curved in cross section. The density of the prisms 517 generally increases with distance from the lamp 518.

In alternate embodiments the aperture layer 506 can be made of a light absorbing material, and in alternate embodiments the surfaces of shutter 503 can be coated with either a light absorbing or a light reflecting material. In alternate embodiments the aperture layer 506 can be deposited directly on the surface of the light guide 516. In alternate embodiments the aperture layer 506 need not be disposed on the same substrate as the shutters 503 and anchors 505 (see the MEMS-down configuration described below). These and other embodiments for a display illumination system are described in detail in the U.S. patent application Ser. Nos. 11/218,690 (now U.S. Pat. No. 7,417,782) and 11/528,191, the entireties of which are incorporated herein by reference.

In one implementation the light sources 518 can include lamps of different colors, for instance, the colors red, green, and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps or red, green, blue, and yellow lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a working fluid 530. The working fluid 530 is engineered with viscosities preferably below about 10 centipoise and with relative dielectric constant preferably above about 2.0, and dielectric breakdown strengths above about $10^4$ V/cm. The working fluid 530 can also serve as a lubricant. In one implementation, the working fluid 530 is a hydrophobic liquid with a high surface wetting capability. In alternate implementations the working fluid 530 has a refractive index that is either greater than or less than that of the substrate 504.

When the MEMS-based display assembly includes a liquid for the working fluid 530, the liquid at least partially surrounds the moving parts of the MEMS-based light modulator. In order to reduce the actuation voltages, the liquid has a viscosity preferably below 70 centipoise, more preferably below 10 centipoise. Liquids with viscosities below 70 centipoise can include materials with low molecular weights: below 4000 grams/mole, or in some cases below 400 grams/mole. Suitable working fluids 530 include, without limitation, de-ionized water, methanol, ethanol and other alcohols, paraffins, olefins, ethers, silicone oils, fluorinated silicone oils, or other natural or synthetic solvents or lubricants. Useful working fluids can be polydimethylsiloxanes, such as hexamethyldisiloxane and octamethyltrilosane, or alkyl methyl siloxanes such as hexylpentamethyldisiloxane. Useful working fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. And other fluids considered for these display assemblies include butyl acetate, dimethylformamide.

For many embodiments it is advantageous to incorporate a mixture of the above fluids. For instance mixtures of alkanes or mixtures of polydimethylsiloxanes can be useful where the mixture includes molecules with a range of molecular weights. It is also possible to optimize properties by mixing fluids from different families or fluids with different properties. For instance, the surface wetting properties of a hexamethyldisiloxane and be combined with the low viscosity of butanone to create an improved fluid.

A sheet metal or molded plastic assembly bracket 532 holds the cover plate 522, the substrate 504, the backlight 516 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of light guide 516 back into the light guide. Not shown in FIG. 5 are electrical interconnects which provide control signals as well as power to the shutter assemblies 502 and the lamps 518.

Further details and alternate configurations for the display apparatus 500, including manufacturing methods therefore, can be found in the U.S. patent application Ser. Nos. 11/361,785 and 11/731,628, the entireties of which are incorporated herein by reference.

Display apparatus 500 is referred to as the MEMS-up configuration, wherein the MEMS based light modulators are formed on a front surface of substrate 504, i.e. the surface that faces toward the viewer. The shutter assemblies 502 are built directly on top of the reflective aperture layer 506. In an alternate embodiment of the invention, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in display apparatus 500 and is oriented such that the MEMS-based light modulators are positioned on the rear surface of the top substrate, i.e. the surface that faces away from the viewer and toward the back light 516. The MEMS-based light modulators are thereby positioned directly opposite to and across a gap from the reflective aperture layer. The gap can be maintained by a series of spacer posts connecting the aperture plate and the substrate on which the MEMS modulators are formed. In some implementations the spacers are disposed within or between each pixel in the array. The gap or distance that separates the MEMS light modulators from their corresponding apertures is preferably less than 10 microns, or a distance that is less than the overlap between shutters and apertures, such as overlap 416. Further details and alternate embodiments for the MEMS-down display configuration can be found in the U.S. patent applications Ser. Nos. 11/361,785, 11/528,191, and 11/731,628 referenced above.

In other embodiments, the roller-based light modulator 220, the light tap 250, or the electrowetting-based light modulation array 270, as well as other MEMS-based light modulators, can be substituted for the shutter assemblies 502 within the display assembly 500.

To eliminate the formation of bubbles within a certain part of the display such as the directly viewable area, at least one bubble is formed or induced to be formed within a different part of the display (such as areas that are under cover) within a portion of the same working fluid volume contained in the space enclosed by the sealing material and the substrates (FIG. 5). This fluid volume within the display is defined by the two substrate surfaces facing each other across the gap and the sealing material joining them. If a bubble is maintained throughout the life of the device within this space, it will prevent other bubbles from forming. If however, conditions lead to the dissolution of all bubbles (say because of high pressure, high temperature of other conditions), the bubble may reform within any location of the working fluid when conditions are optimal for its formation. For this reason, this invention leads with the creation of one or more bubble trapping regions within either or both of the substrates defining parts of the space enclosed by the seal (and preferably in a location that does not interfere with the device operation), and the inducement of a seed bubble within it.

Because of capillary action from the height of the bubble trapping region, primarily determined by the height of the adhesive seal 528), and the selection of a working fluid that is energetically favorable (one example is oil, although any working fluid capable that has similar characteristic is suitable), once the bubble comes to reside in a bubble trapping region, it will remain there, primarily displacing itself within it. The bubble will not escape, as long as its volume does not exceed the available volume within the bubble trapping region. In this fashion, by creating and maintaining the bubble within the bubble trapping region, and engineering the bubble to bubble trapping region ratio, we can manufacture a display in which we can control the location of any display bubbles.

The size and depth of the bubble trapping region is influenced by a number of factors. These include but may not be limited to; the properties of the working fluid, the volume of the working fluid beings used in the display (itself roughly a measure of display size and heights between substrates), the expected lowest and highest temperatures to which the display will be exposed, the expansion coefficients of both the working fluid and the substrates and/or other materials forming the working fluid volume, and others. Taking those and other factors, a bubble trapping region is created that is big enough to hold the largest possible bubble expected to be formed (typically at the lowest temperature), without allowing it to spill out of the bubble trapping region under all conditions. In general, a bubble trapping region that is two to three times as wide as it is deep (into the substrate) is optimal, although other combinations are effective. Typical embodiments may be accomplished using bubble trapping region depths as short as 10 microns, and as deep as 500 microns (a function of the substrate thickness without compromising substrate mechanical integrity), with respective widths as described above. Again, it is critical that the bubble created does not disappear from all bubble trapping regions under the highest pressure conditions expected (typically at the highest temperatures encountered).

FIGS. 6A through 6F illustrate example embodiments of the bubble trapping region, where a substrate 600 has a bubble trapping region, which for illustrative purposes is in the shape of a trench. A trench is optimal for display devices, where the edges of the display outside of the active region are usually used for mechanical attachments and either not viewable by the user, or of lesser optical value. Bubble trapping regions in such areas of these devices may be created while minimizing or eliminating any detrimental effect the bubble may have in either the operation and/or the perceived quality of the display. Note that other embodiments may implement the location and shape of the bubble trapping region in any number of other geometric shapes, e.g. circles, squares, etc. In fact, some embodiments may even decide to display the bubble to the user as part of unique marketing strategies. These may include games (such as a level or maze game), and/or company logo or message.

Figure 6A:
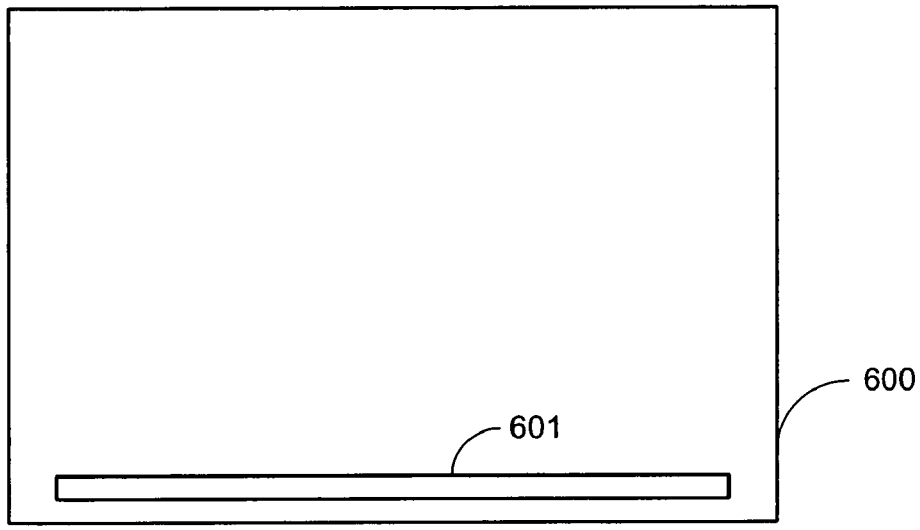
FIGS. 6A, 6B, 6C, 6D, 6E and 6F are views of potential bubble trapping regions within a substrate according to an illustrative embodiment of the invention.
Figure 6B:
Figure 6C:
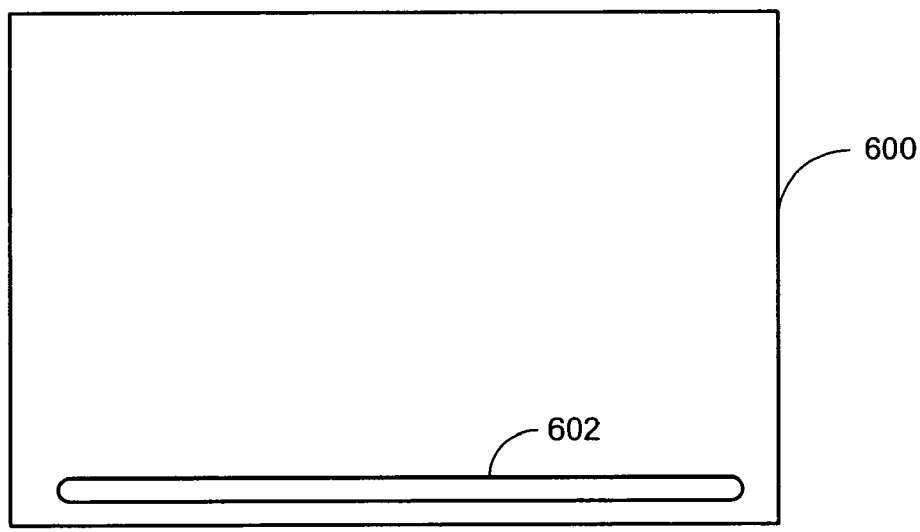
Figure 6D:
Figure 6E:
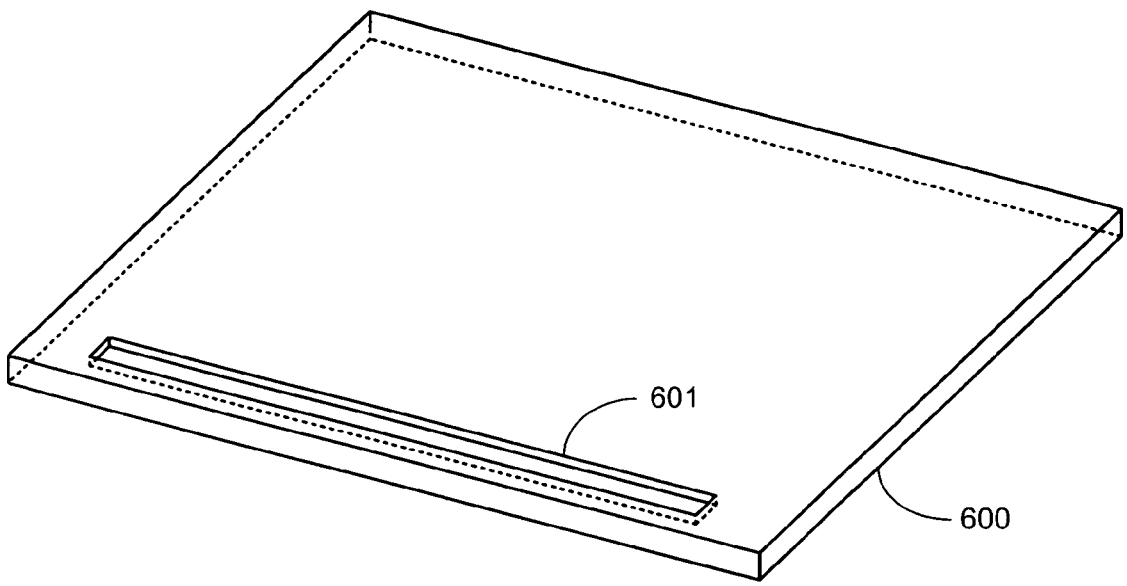
Figure 6F:
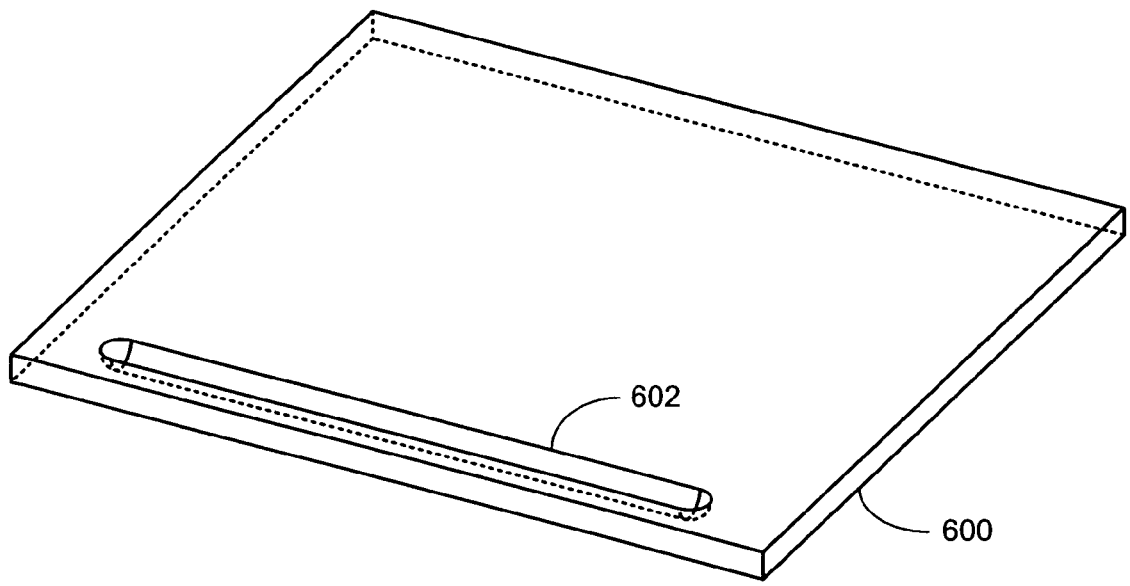

In one embodiment, creating each bubble trapping region may be accomplished via a variety of methods, any which would remove material in the desired shape. These may include acid etching, laser etching, spark-cutting, plasma etching, mechanical drilling or sawing, sandblasting and others. The method used will in large part determine the shape of the bubble trapping region. Mechanical milling means (such as, saws, plasma etching) are used to create sharp edge 601 bubble trapping regions (FIGS. 6A, 6B and 6E). Many ablation methods (such as forms of laser etching, sandblasting, as well as some chemical methods) will tend to create dug-out, trench or scooped bubble trapping regions 602, similar to those made when scooping ice cream (FIGS. 6C, 6D and 6F).

The above bubble trapping regions within either substrate may be created at any number of steps during the manufacturing process. Those skilled in the semiconductor fabrication arts will appreciate that if the process is done before thin film processing, a backfill material will help with the sensitivity of the processing towards topography. Alternatively, any bubble trapping region created on either substrate after all MEMS creation steps have been performed needs to protect the delicate mechanical parts from any debris formed. In one embodiment, this may be possible through the addition of a protective layer which gets removed after the bubble trapping region creation. In one embodiment, additional steps such as coating the walls of the bubble trapping region with a light absorbing film may be undertaken.

Figure 7A:
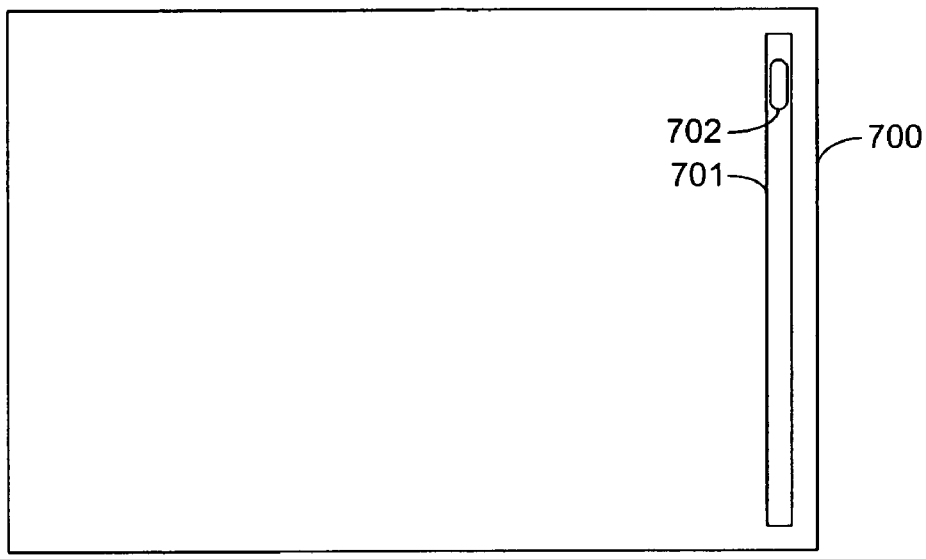
FIGS. 7A, 7B, 7C and 8 are views of potential bubble trapping region configurations on a substrate according to an illustrative embodiment of the invention.
Figure 7B:
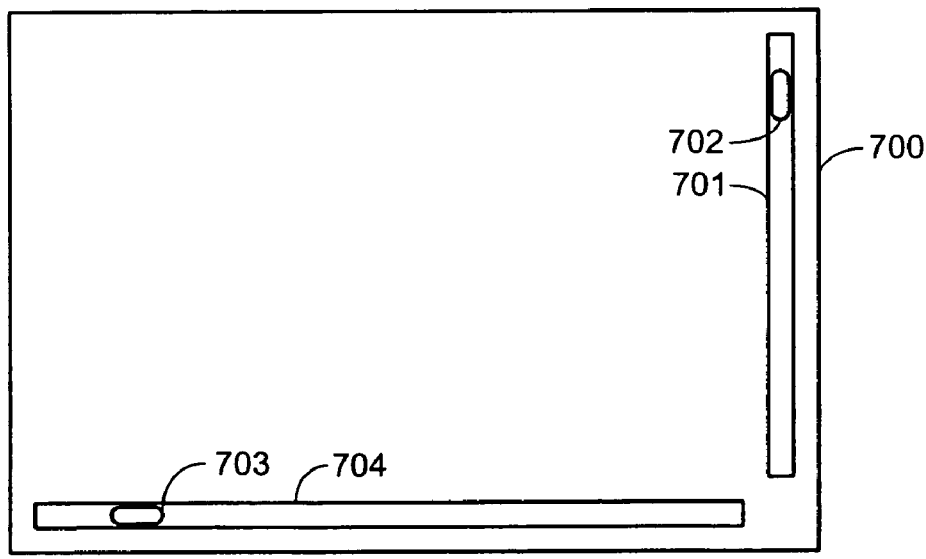
Figure 7C:
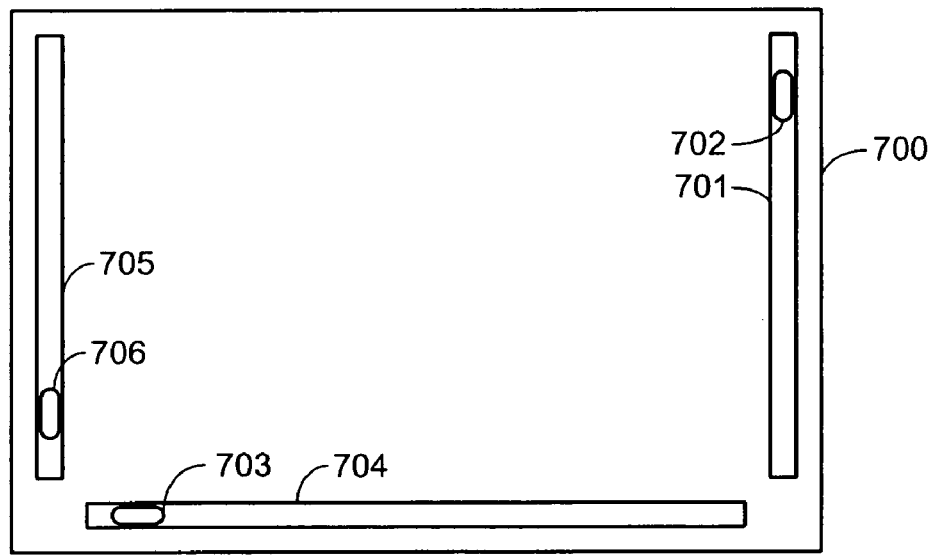
Figure 8:
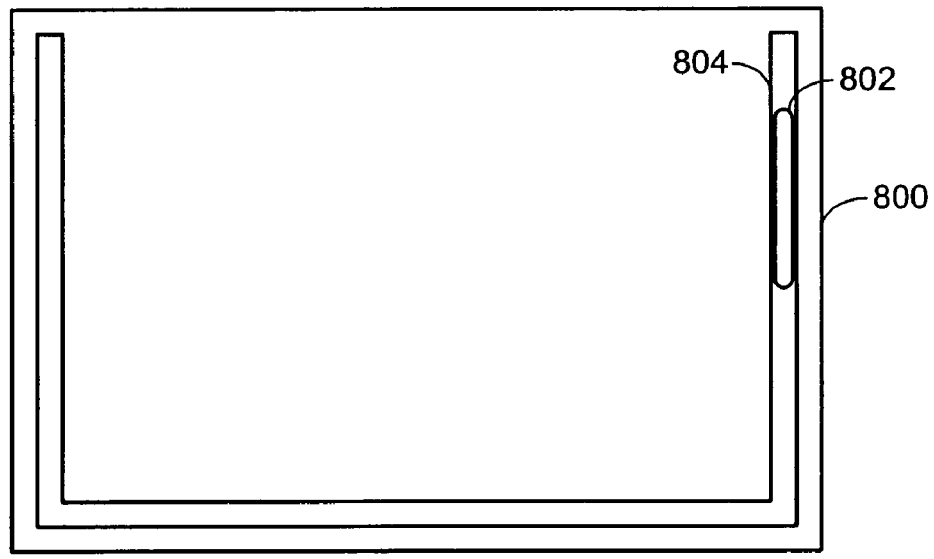

One or more bubble trapping regions may be used, each needs to house a bubble 702. Various layouts may be used to implement the bubble trapping region 701 on the substrate 700. In FIG. 7A we see the bubble trapping region implemented along the complete side of the substrate. As in other example embodiments, the bubble 702 occupies a portion of the available bubble trapping region volume. As seen in FIG. 7B, multiple discrete bubble trapping regions 701, 703 may be embodied, and in this example each of them is endowed with a bubble 702, 704. FIG. 7C illustrates an example embodiment where three discrete bubble trapping regions 701, 703, 705 within the same substrate 700 each contain bubble 702, 704, 706. FIG. 8 illustrates an embodiment where the substrate 800 has a continuous U-shaped bubble trapping region 802 with a single bubble 804. In the illustrative embodiments, the bubble trapping regions occupy the majority of the sides on which they are implemented.

Figure 9:
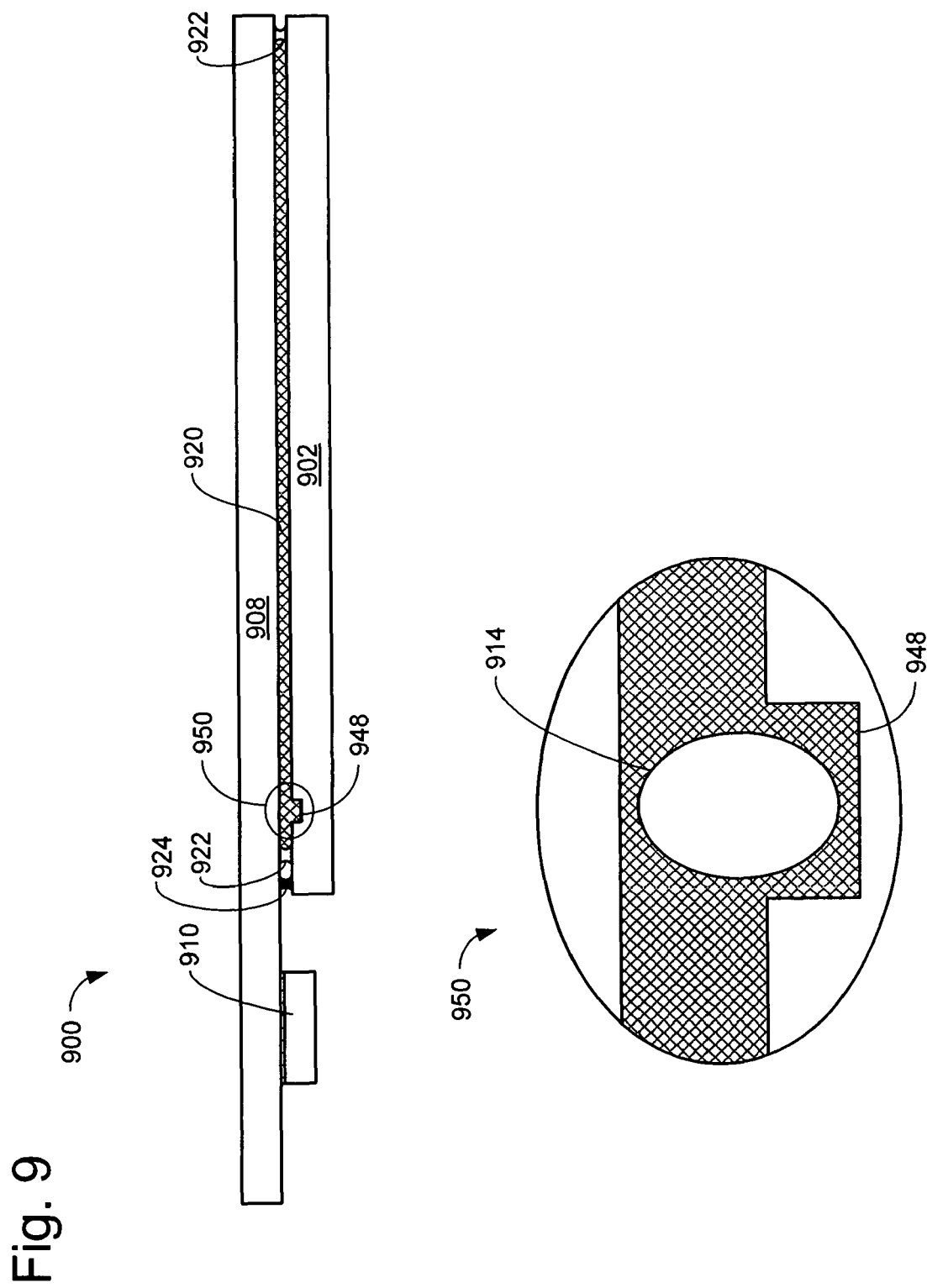
FIG. 9 is a view of an assembled panel illustrating a potential bubble trapping region location according to an illustrative embodiment of the invention.

FIG. 9 is a cross-sectional view of a display assembly 900 which incorporates a bubble trapping region according to an illustrative embodiment of the invention. The display assembly 900 is a specific example of a display utilizing a MEMS-down modulator substrate 908, coupled across a gap to an aperture plate 902 by the sealing material 922 around the periphery. The sealing material 922 and the aforementioned first and second substrates, creates a space 920 enclosed by the seal, which we then substantially fill with a fluid, except for the portion of the volume within the bubble trapping region 948 which is occupied by the bubble 914 (clearly seen in the close-up of the region 950). The bubble trapping region 948 has been created as a cavity in the shape of a trench extending along the majority of at least one edge of the aperture substrate 902. In one embodiment, we place the bubble trapping region 948 outside the viewable area of the display, while in others it may be placed within it.

The display assembly additionally incorporates a driver circuit 910 and an electrical connection 924 between both substrates, In this embodiment, the bubble trapping region 948 has been created within the surface of the second substrate 902, with the first substrate 908 no bubble trapping region 948. While in this embodiment the bubble trapping region is created in the second substrate surface, other embodiments include its creation on the first substrate surface. In another embodiment, bubble trapping regions are created on both substrates.

The display assembly 900 is illustrative of a bubble trapping region 948 in the MEMS-down configuration. In an alternate embodiment of the invention, a bubble trapping region 948 can be formed in the MEMS-up configuration. For that embodiment, for instance, the cavity can be formed into either the modulator substrate, such as substrate 504 or the cover plate, such as cover plate 522.

The invention is also applicable for incorporation with liquid crystal displays. Although liquid crystal displays often incorporate liquids of high viscosity (>100 centipoise) and relatively low vapor pressures, it is known that bubbles can nevertheless be introduced within the liquid crystal as part of the fluid-fill or manufacturing process. These bubbles are then subject to unwanted and uncontrolled increases or decreases in volume as a function of ambient temperature and/or pressure on the display. The incorporation of a bubble trapping region such as a cavity or a space helps to contain the location of the bubble, especially if that bubble trapping region extends along the majority of one edge of the display, as in bubble trapping region 601. Those skilled in the art would quickly grasp that in one embodiment, the bubble trapping region would be located on the modulator substrate. In another, it would be located on the color filter substrate.

The invention is also applicable to electrowetting displays, illustrated in FIG. 2D, in which case the bubble trapping region can be formed onto either the modulator substrate, which provides drive signals for the motion of the fluids, or onto the cover plate.

Figure 12:
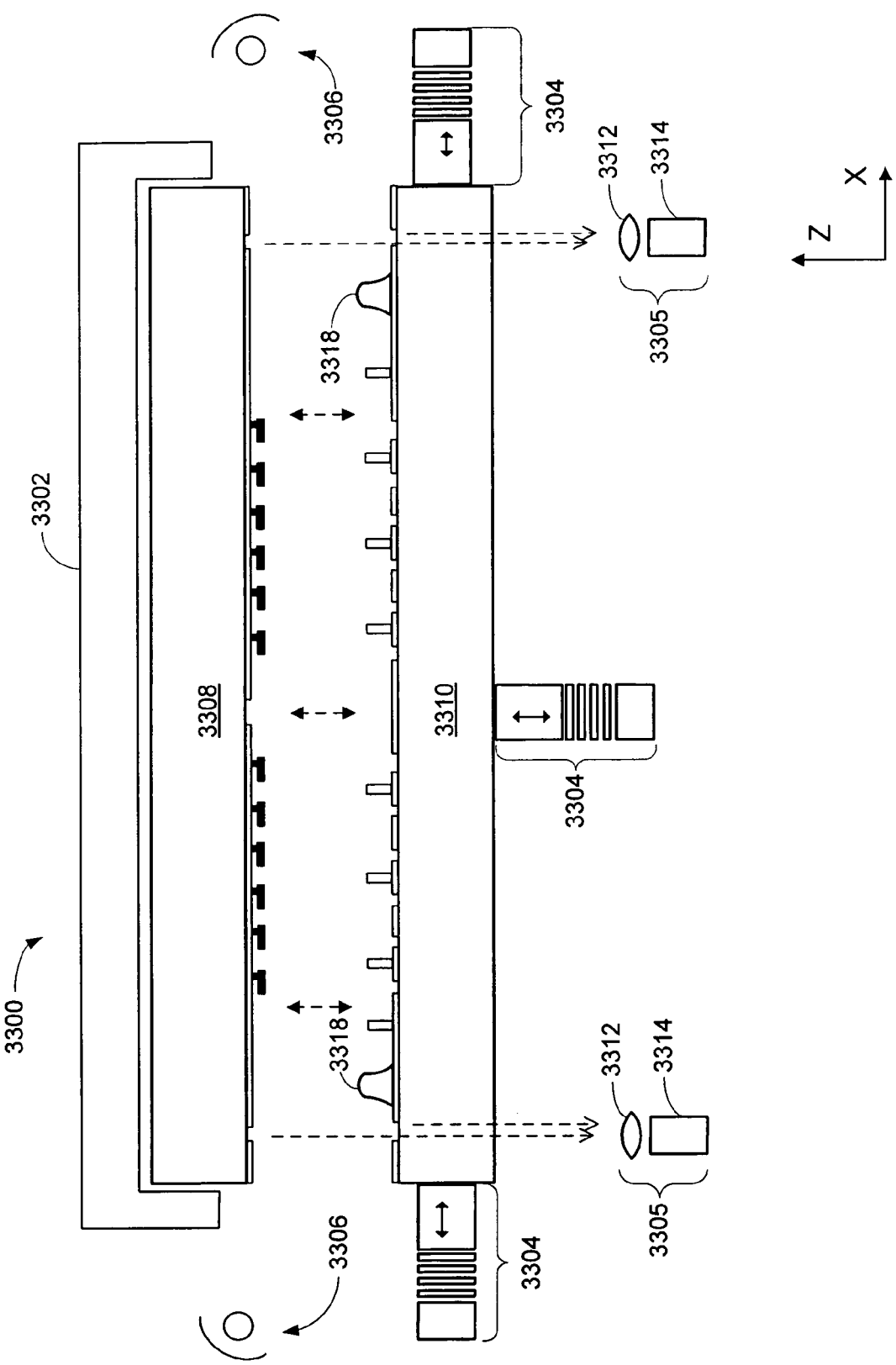
FIG. 12 is a conceptual view of a precision substrate alignment apparatus, according to an illustrative embodiment of the invention.

Once the bubble trapping regions are created, the substrates are carefully aligned and bonded together to create a volume. One method for alignment of the two substrates is made possible by an alignment apparatus 3300, as illustrated in FIG. 12, according to an illustrative embodiment of the invention.

In another embodiment, the bubble trapping region or bubble hosting function may be accomplished by the geometric placement of substrates atop each other, similar to the space or recess created by a shelf overhang. In FIG. 10A, we see an example embodiment where this is accomplished by placing a MEMS-down modulator substrate 1004, across a gap maintained by spacers 1010, on top of an aperture substrate 1002. Note that the center substrate may be the modulator substrate, while in another it may be the aperture, and in another a thin film. In one embodiment, substrate 1004 could be an aperture substrate, attached to a third substrate 1006 which is sized to match the modulator substrate 1002, or 1004 could be the modulator, attached to the larger substrate 1006 opposite the aperture substrate 1002. In another embodiment, 1006 remain as the aperture substrate, while the substrate 1004 is a thin film or tape.

A sealing material 1008 is used around the periphery, which creates the space 1014 enclosed by the seal which will be substantially filled by the fluid, except for the portion of the volume within one or more of the bubble trapping region 1016 which is occupied by the bubble 1012 which are induced as described below. The spacers 1010 maintain the critical gap between substrates, effectively the active optical area of the display. This gap may be as small as 1 micron, or as large as 15-20 microns, with a typical dimension of 10 microns. The height of this bubble trapping region 1016 results from the height of the seal material 1008 and the thickness of the center substrate 1004.

In one embodiment, we implement the bubble trapping region using at least twice the height of the gap created by the spacers 1010 to prevent the migration of the bubble into the gap between the substrates that is intended for user viewing. In one embodiment the bubble trapping region is created as a central shelf, fully surrounding the substrate 1004 (similar to a Moat around a medieval castle). In another embodiment, a similar effect is accomplished by creating a three sided shelf, a two sided shelf or even a shelf simply on one side.

A similar shelf effect may be accomplished in the embodiment shown in FIG. 10B, where the substrate 1005 is created with higher thickness, and one or more spaces around the edge are worn or milled (again using mechanical or chemical means similar to those used in creating the bubble trapping region) to ensure the bubble 1012 is located there.

A critical aspect of the invention is providing electrical connections to the substrate surfaces within the space enclosed by the seal 1014. As seen in FIG. 9, in one embodiment this is accomplished outside this space by an electrical connection 924 between the substrates. As seen in the example of FIG. 10A or 10B, this may also be accomplished inside this space 1014. In one embodiment, this may be accomplished by placing pads with the appropriate signal via on one of the substrates, a similar pad and via on the substrate across the gap, then placing conductive or silver epoxy spacer 1011 (or a similar hardening conducive material) in place of the non-conductive spacer 1010 structure. In this fashion, both sides of the display would be connected via connections across the gap between substrates. As with the case of the bubble trapping region in FIG. 10B, we can use these conducive pads and spacers 1011 to electrically connect the upper and lower substrates. Also as is the geometric case of FIG. 10A, the shelf may be built all around, three sides, two sides and even one side.

FIGS. 11A and 11B illustrate top and cross-sectional views of an illustrative embodiment utilizing a spacer wall of closely spaced apart spacers 1110 to create the bubble trapping region. This embodiment has the advantage of using a single gap distance within the complete display, unlike the others where a larger or higher bubble trapping region or space is be created to house the bubble. A substrate 1104 (as in the case of FIG. 9, it may either be the aperture or modulator substrates, as long as the other 1102 is its complement) is placed on another substrate 1102. The sealing material 1108 is used to create the space enclosed by the seal 1116 that will be filled with the working fluid. As we have seen before, spacers 1110 are used to maintain the correct gap distance between substrates. In this embodiment, the spacers 1110 are closely located to create a wall structure with a gap between the display area and the sealing material 1108.

The bubble 1112 is allowed to be formed (using any of the methods described elsewhere in this specification), and the space enclosed by the seal is sealed to the outside world through the use of one or more plugs 1109. This peripheral corridor serves as a partition in the space enclosed by the seal to restrict any induced bubbles from entering the internal viewable portion of the display. Because in this case the bubble trapping region height is equal to the height of the space enclosed by the seal, special care is taken to prevent the migration of the bubble into the display across the spacer wall 1110. This is accomplished by minimizing the size of the spacer wall openings 1106 across the spacer wall 1110 to around 1-2 microns. This allows fluid flow while keeping the bubble within the bubble trapping region.

In another embodiment, the bubble trapping region is created by treating portions of the substrate within the space enclosed by the seal with a high surface tension coating which oil does not wet. As before, this may be done along the edge, or in any area considered appropriate. Because the oil does not readily wet the area treated with the coating, any bubbles that form will form on the area treated with the coating.

The alignment apparatus 3300 comprises a stationary chuck 3302, a set of translational drives or motors 3304, a vision system 3305, and a set of UV exposure lamps 3306. A modulator substrate 3308 is rigidly attached to the chuck 3302. An aperture plate 3310 is held in place and guided by the motors 3304. The motors 3304 provide the ability to translate the substrate 3310 in three translational directions, for instance along x and y coordinates within the plane of substrate 3310 and additionally along the z coordinate establishing and varying the distance between the two substrates 3308 and 3310. Additionally, not shown in FIG. 12, an additional and optional set of three rotational motors can be provided, which ensure both the co-planarity of the substrates 3308 and 3310 and also their proper rotational relationship in the x-y plane. Although all translational motors 3304 are shown attached to the aperture plate 3310, in other embodiments the motors can be arranged differently between the two substrates. For instance the x-y translation motors can be attached to the aperture plate 3310 while the z-axis translation motor and theta rotation motor (about the z-axis) can be attached to the chuck 3302.

A variety of motor types are available for the motors 3304. In some embodiments these motors can be digitally controlled stepper motors, in some cases they can be linear screw drives, and in other cases they can be magnetically-driven solenoid drives. The motors need not be arranged to directly move a substrate, such as substrate 3310. They can instead be designed to move a stage or platter onto which the working piece or substrate 3310 is rigidly attached. The use of a moving stage is advantageous, since an additional optical measuring system (in some cases a laser interference system) can be provided for the stage which is capable of continuously measuring its translational position to a precision of better than 1 .mu.m. Feedback electronics can then be employed between the motors 3304 and the optical measurement system to improve both the accuracy and stability of the stage position.

In some embodiments of apparatus 3300 both the chuck 3302 and the optional moving stage can be equipped with heaters and/or temperature control devices, to ensure uniform temperature across the substrates 3308 and 3310. Uniform temperatures help to ensure proper alignment between patterns on the two substrates, particularly for substrates whose diagonals exceed about 20 centimeters.

The alignment apparatus 3300 incorporates a vision system 3305 for detecting the relative positions of the two substrates 3308 and 3310. In a preferred embodiment, alignment marks are patterned into thin films on each of the substrates 3308 and 3310 (see, for example, the alignment marks 3408 and 3412 in FIG. 13. The vision system is capable of simultaneously imaging alignment marks on each of the two substrates, despite the fact that the marks are located on different surfaces, i.e. at different positions on the z axis.

For the illustrated embodiment, the vision system 3305 incorporates two imaging lenses 3312 and 3313 and either a microscope capable of split-field imaging or two cameras 3314 and 3315. The vision system 3305 is therefore capable of imaging, substantially simultaneously, two separated sets of alignment marks. The two sets of alignment marks are preferably located at the far sides or corners of the modulation array or panel.

In operation, an operator uses the vision system 3305 to view the relative positions of alignment marks, such as marks 3408 and 3412, and thereby judge the direction and degree of misalignment between the two substrates. The operator can then adjust the alignment between substrates 3308 and 3310, using drive motors 3304, until the alignment marks on the two substrates indicate misalignment below an acceptable degree of error. After sufficiently reducing the misalignment, the operator drives the z-axis motor until the spacers, such as any of the spacers 1010, on one of the substrates, 3308 or 3310, contact the opposing substrate, 3308 or 3310, or opposing spacers. In many instances, due to mis-orientation or non-planarity of the substrates, the operator will need to continually refine the x-y alignment between the substrates as the z-axis distance between the two substrates is decreased. In some embodiments, a final x, y, and theta correction can be made even after contact is established between the substrates.

After contact is made, an adhesive 3318 will also make contact between the two substrates. In some embodiments, as the last step in the method 3301, the adhesive is at least partially cured while the alignment apparatus 3300 holds the two substrates in position. The UV exposure lamps 3306 can be used to initiate or accelerate the curing of the adhesive, thereby bonding the two substrates together. In some embodiments the substrate stage or the chuck 3302 is equipped with heaters to affect a thermal curing of adhesive 3318. The alignment marks, e.g. marks 3408 and 3412, are usually patterned and etched at the same time and are printed from the same photomask as the masks used to pattern the apertures. The alignment marks are therefore designed for a fiduciary marker function, i.e. the operator who achieves sufficient alignment between the alignment marks has confidence that the shutters and apertures in the neighboring array will also be in properly aligned.

According to the discussion of display apparatus, the overlap is preferably greater than or equal to 2 .mu.m. In practice an overlap W2, which is reliably achieved during manufacture, is determined by a safety margin, designed into the masks, and by an alignment precision or tolerance. The precision or achievable tolerance is based on the design of alignment apparatus 3300, the design of the alignment marks, and process variables such as temperature, pressure, and the viscosity or plasticity of seal materials. Two examples are provided below for acceptable tolerance design: In the first example, which is tolerant of relatively wide variations in alignment during manufacture, an array of shutters and apertures is designed with a nominal overlap of 22 .mu.m, i.e. if perfectly aligned, the shutters are designed to overlap the apertures by 22 .mu.m. If the apparatus 3300 then enables an alignment repeatability of .±0.20 .mu.m, the designer can be assured that all (or 99.99% depending on how reliability is specified) of the shutters will have an overlap of at least 2 .mu.m. However, for a dense array of pixels, i.e. for a high resolution display, there is not usually room available in an array design for 22 .mu.m of overlap. Therefore a more precise alignment capability is desired.

In the second example, a nominal overlap of only 1 .mu.m is provided for in the masks, and the apparatus 3300 is designed to provide an alignment precision within .±0.1

.mu.m between patterns on the first and second substrates. To achieve this precision a) the vision system 3305 a resolution smaller than 1 .mu.m, b) the motors 3304 (or associated translation stages) stably drive to and resolve position differences with a resolution smaller than 1 .mu.m, and c) the alignment marks are patterned and etched with edges, dimensions, and/or placements that are precise to a resolution of better than 1 .mu.m. Automated alignment systems with sub-micron precision are available today for purposes of semiconductor mask alignment, optoelectronic component assembly, and micro-medical devices. Representative suppliers of these systems include the Automation Tooling Systems Corp. of Cambridge, Ontario, Canada and the Physik Instrumente LP of Karlsruhe, Germany.

Generally, if attention is paid to the design of the vision system, the drive motors, and the design of the alignment marks, then it possible to provide an alignment apparatus 3300 and an alignment method which is capable of ensuring an overlap between shutters and apertures that is greater than 0 .mu.m and less than 20 .mu.m. In a preferred design, the alignment method is capable of ensuring and overlap that is greater than 0 microns and less than 2 microns.

The alignment method described above was provided as one example of an alignment method that assigns active control of the motors 3304 to a human operator. In other methods the intervention of an operator is not required to achieve alignment. Intelligent vision (machine vision) systems are available, for example, from the vendors identified above, for the apparatus 3300 (i.e. systems which include digital cameras and computer image processing) that can measure the direction as well-as the amount of misalignment between fiducials on two substrates and then can automatically drive the motors 3304 until the measured misalignment becomes less than a pre-specified level.

The alignment marks or fiducials employed by apparatus 3300 can take many forms, other than those shown or discussed with respect to FIG. 12 below. In some embodiments the operator or the machine vision system is capable of recognizing specific functional patterns on the substrates, such as the shapes of shutter assemblies or apertures. The vision system thereby measures and minimizes directly the misalignment between shutters and apertures. In another embodiment, the display edges are cut or diced to a precise position with respect to the positions of the shutters and apertures. The vision system thereby measures and minimizes the misalignment between the edges of the two substrates.

After either a human operator or the automatic alignment system brings the substrates into alignment and establishes contact between the two substrates, the UV exposure lamps 3306 can be employed to at least partially cure the adhesive 3318. The adhesive bonding material 3318 prevents the subsequent relative movement between substrates 3308 and 3310 after alignment has been achieved in apparatus 3300. Alternate means are available for maintaining alignment between the two substrates after alignment. These alternate means include the use of alignment guides, such as alignment guides, and heat reflowable spacer materials such as spacer.

Although the functioning of alignment apparatus 3300 was with the example of display 2340 in the MEMS-down configuration, similar alignment techniques can be useful when applied to the MEMS-up configuration, as illustrated by display apparatus 500. In display assembly 500 the shutter assemblies 502 are formed on substrate 504 while the black matrix and associated apertures 524 are formed on substrate 522. The two substrates 504 and 522 can be aligned using alignment apparatus 3300 such that an overlap exists between at least one edge of the shutters 503 and the edge of a corresponding aperture in black matrix 524. The alignment apparatus 3300 ensures an overlap between edges of between 0 and 20 microns. In a preferred design, the alignment method ensures an overlap that is greater than 0 microns and less than 5 microns, or in some cases, less than 2 microns.

Although the functioning of alignment apparatus 3300 was described for a display incorporating transverse-shutter-based light modulators, such as a shutter assembly, it will be understood that the alignment apparatus 3300 and alignment method described above can be usefully applied to alternate MEMS light modulator technologies. For instance, the electrowetting modulator array benefits when the aperture plate is aligned to the modulator substrate such that an overlap is established between the edge of the oil and the edge of apertures in the light-obstructing, filtered, or dark state. Similarly rolling actuator light modulators, such as light modulator 220 can be fabricated and aligned in similar fashion, wherein an overlap is provided between the light obstructing edge of the roller-actuator-modulator on a first substrate and the edge of a corresponding aperture which has been patterned on a second substrate.

Other non-shutter-based modulators can benefit from the alignment apparatus 3300 and method described above. For instance, a MEMS interference modulator or a MEMS light tap modulator, such as light modulator 250, fabricated on a first substrate can be aligned to the edge of a black matrix fabricated on a second substrate. Details of these light modulators can be found in U.S. Pat. Nos. 6,674,562 and 5,771,321, incorporated herein by reference.

Panel Fabrication Processes

Figure 13:
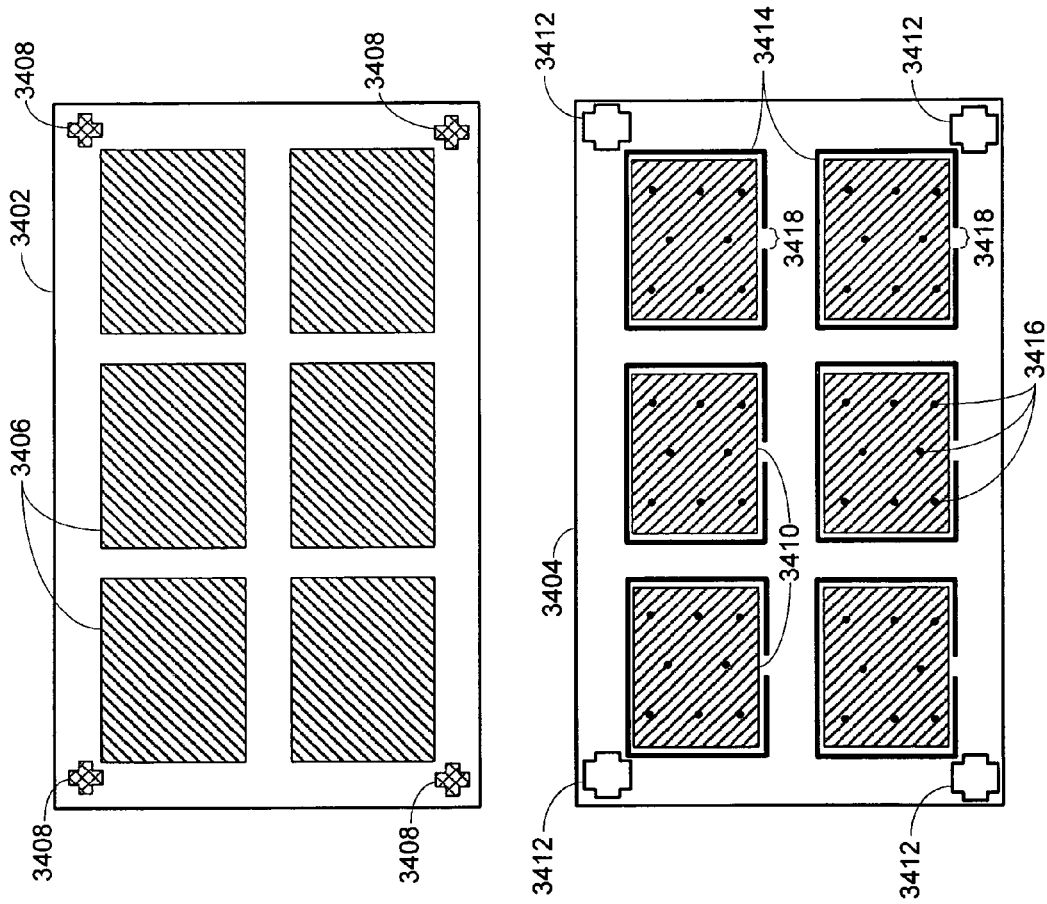
FIG. 13 is a plan view of a modulator substrate and an aperture plate comprising multiple modulator and aperture arrays respectively, according to an illustrative embodiment of the invention.
Figure 18:
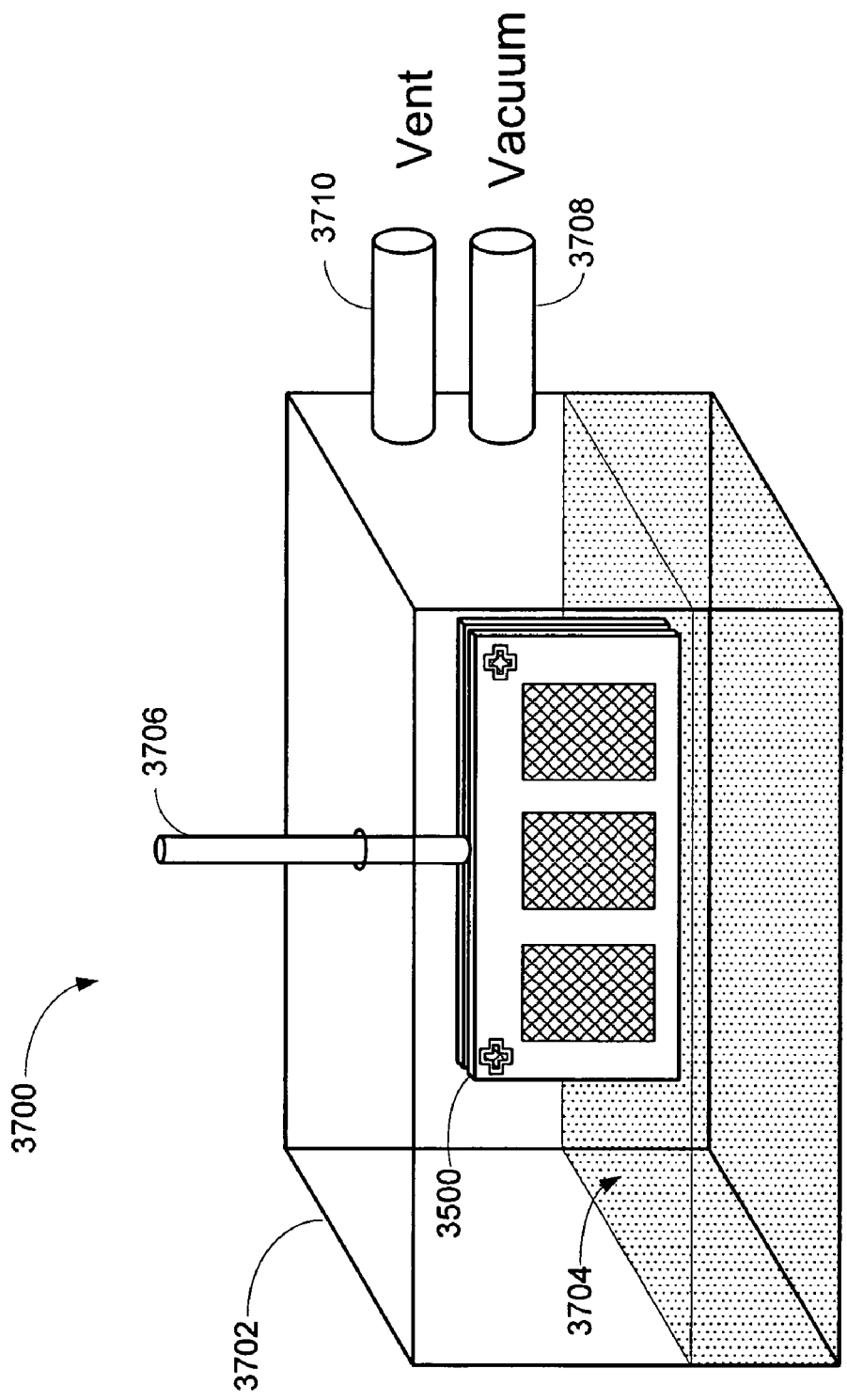

Manufacturing productivity is increased whenever the modulator arrays for multiple displays can be built in parallel fashion on the same glass or plastic substrate. Large glass substrates, referred to as panels, and associated fabrication equipment, are now available in sizes up to 2 meters square. FIG. 13 illustrates how multiple arrays of MEMS light modulators can be formed onto one large modulator substrate 3402 while multiple arrays of aperture holes can be formed on a large aperture plate 3404, according to an illustrative embodiment of the invention. The panel 3402 includes a set of 6 modulator arrays 3406 plus a set of four modulator alignment marks 3408. The panel 3404 includes a set of six aperture arrays 3410 plus a set of four aperture alignment marks 3412. Each of the modulator arrays 3406 is designed to correspond to one of the aperture arrays 3410, such that when the panels 3402 and 3404 are aligned and sealed together, the corresponding modulator array--aperture array pairs will each form a display assembly, also referred to as a cell assembly. A single alignment and sealing operation between substrates 3402 and 3404, then, suffices to simultaneously align and seal 6 cell assemblies. For the example shown in FIG. 18, the glass panels 3402 and 3704 are 30 cm in diagonal while each of the cell assemblies or display areas would be 10 cm in diagonal. In other embodiments, panels as large as or larger than 50 cm in diagonal may be employed to fabricate up twenty five 10 cm diagonal displays per panel.

Also shown are the epoxy adhesive lines (one type of seal material) 3414, and spacer posts 3416 added to each of the arrays on the aperture plate 3404. A variety of spacers are applied to the interior of each array on aperture plate 3404, as described with respect to display assemblies. The process for applying the adhesive will be described below with respect to the cell assembly step 3614.

Figure 14:
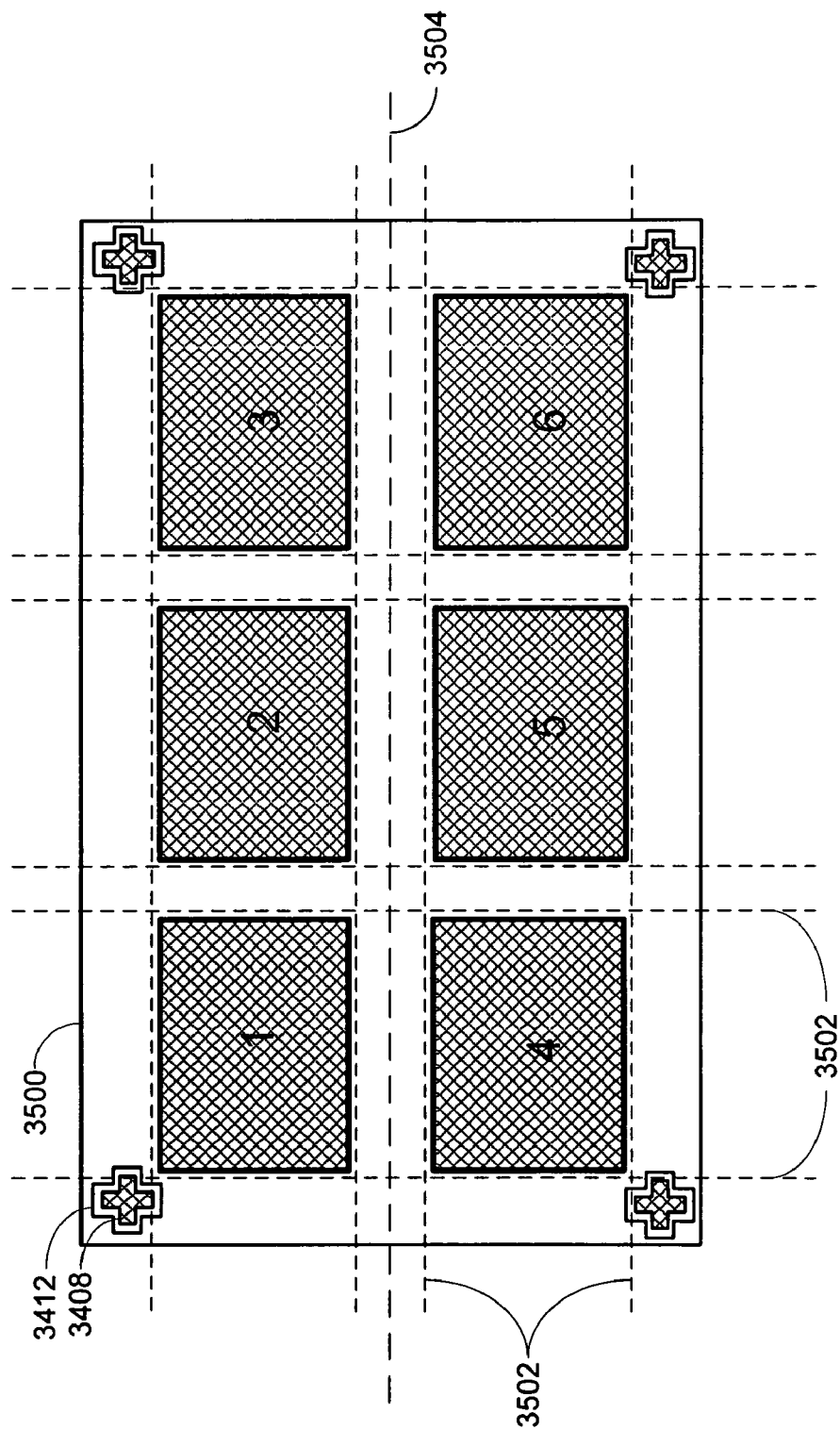
FIG. 14 is a plan view of a panel assembly after alignment, according to an illustrative embodiment of the invention.

A panel assembly 3500, after completion of alignment and seal of panels 3402 and 3404, is illustrated in the FIG. 14, according to an illustrative embodiment of the invention.

Successful alignment of the two substrates is indicated by the nesting of the modulator alignment marks 3408 within the aperture alignment marks 3412. The alignment marks can be designed such that a nominal 1 .mu.m gap is allowed between the inner edge of the mark 3412 with the outer edge of the mark 3408 (the magnitude of these gaps is exaggerated in FIG. 14 for purposes of illustration). In this alignment design, the operator and/or automatic alignment system adjusts the relative position of the substrates in the tool 3300 until appropriate gaps are visible in both the x and y directions for the nested alignment marks, e.g., until none of the lines are crossed or touching. When the appropriate gaps are visible the alignment is considered successful, i.e. misalignment has been reduced to within an acceptable error and the expected overlap between modulators and apertures in each of the arrays 3406 and 3410 has been achieved.

The nominal gap between alignment marks can be designed to match the anticipated precision of the alignment process, e.g. the gap can be 10 microns, or 2 microns, or 1 micron depending on the alignment precision desired. In an alternate design, one alignment mark is a circular dot while the other mark is shaped as a ring. A gap can be designed between the dot and the ring corresponding to the desired alignment precision. In some alignment machine designs, a gap between alignment marks is not required; instead the machine uses a digital camera to estimate the center points of both dot and ring. The alignment software then seeks to align the center-points of dot and ring. The two panels 3402 and 3404 are bonded in place by an adhesive. The curing of this adhesive is described below with respect to the cell assembly step 3620.

FIG. 14 also illustrates a set of dicing lines 3502 superimposed upon the panel assembly 3500. The dicing lines 3502 mark the lines along which the panel will be cut so that individual arrays, also referred to as displays or cell assemblies, can be separated from panel. The separation process, also referred to a singulation, can be accomplished by means of a scribe and break method. In this process a diamond or carbide tip is used to scratch a line along the surface of the glass panels at lines 3502. A simple bending process can then be used to break the panels along the scribe lines. In another embodiment the separation or singulation process is accomplished by means of a dicing saw. It is not necessary that both substrates 3402 and 3408 be cut along the same dicing lines. It is often advantageous that the modulator substrate be diced to a perimeter width that is wider than that prescribed for the aperture substrate. This allows room for the bonding of driver chips, after cell assembly is complete, on the edge of the modulator substrate. At times, such as when dual fill holes are used, the panel is separated into strips by cutting it along the axis 3504.

Cell Assembly Methods Including Fluid Fill

Figure 15:
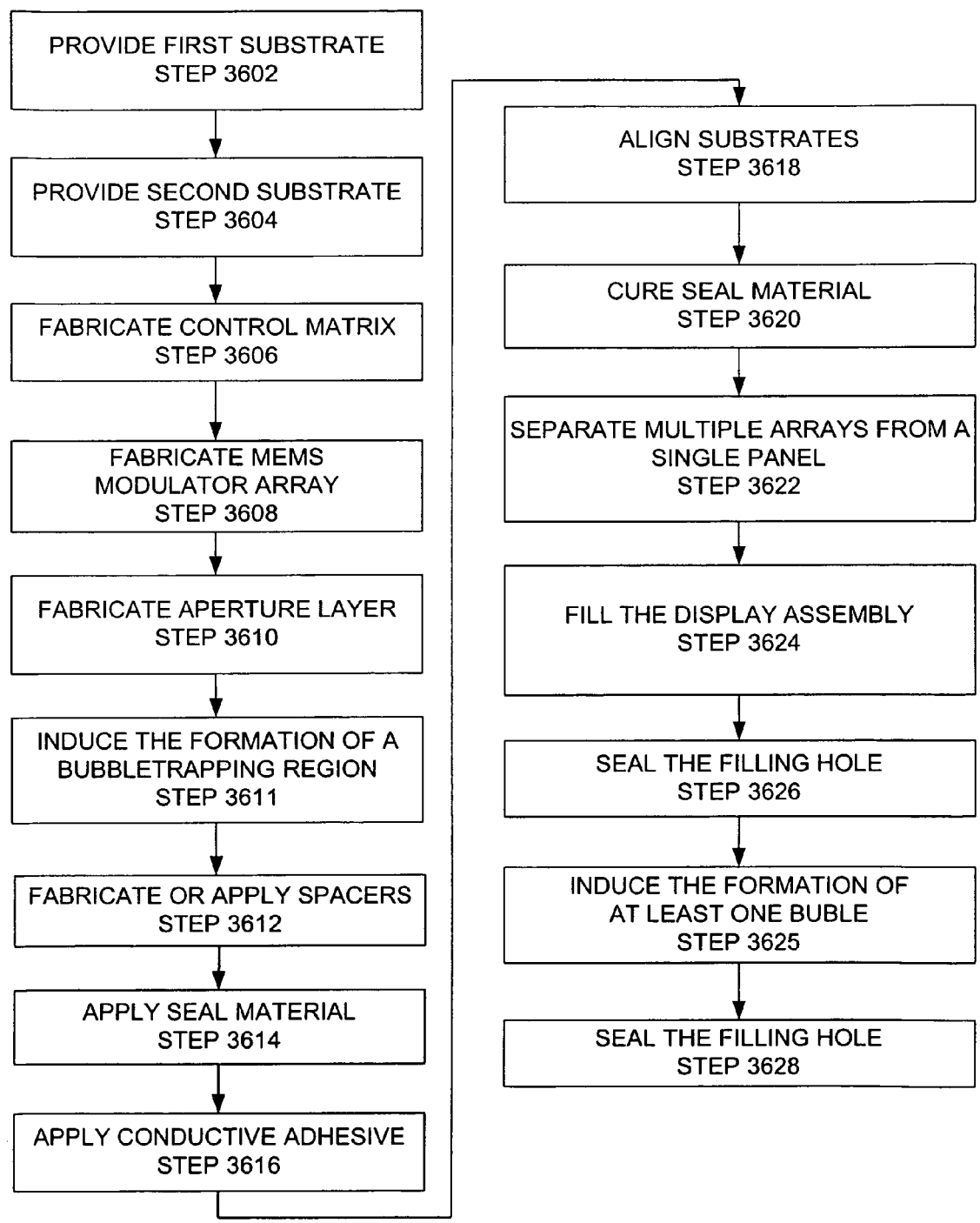
FIG. 15 is a flow chart of a cell assembly method, according to an illustrative embodiment of the invention.

FIG. 15 illustrates a first method 3600 for assembling a display apparatus (also referred to as cell assembly method 3600) incorporating MEMS light modulators, according to an illustrative embodiment of the invention. A first embodiment of method 3600 will be described with respect to a MEMS-down display assembly. A second embodiment, for assembly of displays in the MEMS-up configuration, will be described thereafter.

The cell assembly method 3600 for MEMS-down displays begins with provision of two substrates at steps 3602 and 3604. Both of these substrates are transparent, made from glass or plastic. The assembly method continues with the fabrication of a control matrix, at step 3606, and the fabrication of the MEMS modulator array, at step 3608. In one embodiment both the control matrix and the modulator array are fabricated onto the first substrate, referred to as the modulator substrate. In another embodiment, this may be a point in which to create one or more bubble trapping regions in the modulator substrate. As discussed with respect to display assembly 3100, however, there are embodiments where the control matrix can be fabricated on a substrate distinct from the modulator substrate and be electrically connected to it by means of electrically conductive spacers. Further detail on the fabrication of the modulator substrate can be found in the U.S. patent application Ser. No. 11/361,785 referenced above.

The MEMS-down assembly method 3600 proceeds at step 3610 with the fabrication of an aperture layer. The aperture layer is fabricated onto the second substrate, which is preferably made of a transparent material, e.g. plastic or glass. In the MEMS-down configuration the second substrate is referred to as the aperture plate. In one embodiment, this would be a point at which to create one or more bubble trapping regions in the aperture substrates surface 3611. In other MEMS-down embodiments the second substrate, on which the aperture layer is fabricated, is also utilized as a light guide. In some embodiments, the aperture layer is composed of a light absorbing material which is patterned into a series of apertures. In one embodiment, the aperture layer is designed to reflect light incident from the substrate back toward the substrate.

The method continues with the application of spacers (step 3612) and sealing materials (step 3614) to one or the other of the two substrates; the substrates are then aligned and bonded together. The method 3600 continues at step 3612 with the application of spacers. Any of the spacers illustrated by the spacers 1010 including the fabrication methods described therefore can be incorporated at step 3612. The spacers may be formed onto either or both of the first and second substrates.

The method 3600 continues at step 3614 with the application of a seal material, such as the epoxy seal material 528. The seal material can be applied to either or both of the first and second substrates employed by the method 3600. The seal material is an adhesive bonding material, which will maintain the position of the first and second substrates after the alignment step. The seal material is also used to contain the fluid, to be added at step 3624, within the gap between the two substrates. Applicable seal materials can be a polymer material such as an epoxy, an acrylate, or a silicone material or the seal material can be formed from a heat-reflowable solder metal such as solder bump.

In some embodiments the seal material can be a composite material, such as the anisotropic conductive adhesive 3214. The seal material can be dispensed from a nozzle, which moves along the periphery of each of the modulator or aperture arrays, as shown for display panel 3404 in FIG. 12.

The seal material 3414 does not completely encircle the periphery of each display area on display panel 3404. One or more gaps 3418, referred to as the filling holes, are intentionally left in the peripheral seal to accommodate the filling of the cell with fluid at step 3624. In one embodiment, these may be on opposite sides, along the same side, or in any side. In some embodiments, this gap is left open next to the bubble trapping region, so that as a bubble is induced into the space 920 enclosed by the seal, it may be induced into the bubble trapping region.

The method 3600 continues at step 3616 with the optional dispense of a conductive adhesive. If the spacers or the seal material added at steps 3612 and 3614 do not have a conducting property, then it is often advantageous to add an additional adhesive with this property. The conductive adhesive added at step 3616 allows for an electrical connection between the control matrix on the first substrate and the aperture layer on the second substrate. The adhesive added at step 3616 is usually located at some point along the periphery of the display area.

After dispense, a seal material undergoes a cure step to become relatively hard and rigid. Although seal material may be partially cured as part of the step 3614, in many embodiments a final cure does not occur until one of the later steps 3618 or 3620. The seal material may be formulated to allow for many alternate types of curing, including desiccation curing, UV or ultraviolet curing, thermal curing, or microwave curing. When employing an alignment tool, such as the apparatus 3300, a UV-cured epoxy can be preferred.

As indicated in FIG. 15, the steps for fabrication of the control matrix 3606, fabrication of MEMS modulators 3608, fabrication of the aperture layer 3610, application of spacers 3612, and application of seal material 3614 can all be performed at the panel level where multiple displays are fabricated simultaneously on a large glass or plastic panel. Alternately, these steps may be performed for individual displays on smaller substrates. Further fabrication details for assembly steps 3606, 3608, 3610, and 3612 can be found in the U.S. patent application Ser. No. 11/361,785, referenced above.

The method 3600 continues at step 3618 with the alignment of the first and second substrates, as was described with respect to the alignment apparatus 3300 in FIG. 12. The alignment apparatus 3300 includes a camera and/or microscope system for confirming that the alignment is accurate to within an acceptable degree of error. The first and second substrates are brought into contact by means of the spacers as part of the alignment step 3618.

As part of the alignment step 3618 the adhesive bonding material is at least partially cured to bond or maintain the relative positions of the two substrates. The alignment apparatus 3300 includes heaters and/or UV exposure lamps to affect cure of the adhesive. In some embodiments the whole perimeter seal, such as seal 3414, is at least partially cured as part of step 3618. In other embodiments a plurality of uv-curable adhesive dots is provided on the substrates prior to alignment, in addition to a thermally-curable seal material 3414. For this embodiment only the epoxy dots are cured as part of the alignment step 3618, while the remainder of the seal material is cured later, at step 3620.

The method 3600 continues at step 3620 with the cure of the seal material. In many embodiments the proper alignment between first and second substrates can only be maintained when the seal material behaves as a relatively rigid adhesive. The adhesive cure at step 3620 ensures the rigidity of the seal. The cure at step 3620 can be carried out by either a thermal, UV, or a microwave cure. In some embodiments the seal is cured at step 3620 by placing the assembly into an oven, or UV or microwave exposure system, under pressure or between the plates of a press. The press helps to minimize bending or warping in the substrates while the adhesive is being cured. The press helps to ensure that the gap are maintained by ensuring a rigid contact of each substrate to the spacers.

The method 3600 continues at step 3622 with the optional separation of individual display arrays from a large panel containing multiple arrays. Such separation is only required if the cell assembly steps, up until this point, have proceeded according a large panel process, as described in FIGS. 18. If the modulation substrate and aperture plates are fabricated as individual displays at steps 3606 to 3614, then no singulation or separation step is necessary. The separation may be accomplished by either a scribe and break process or by a dicing saw.

The method includes the separation or singulation of individual displays from a larger panel assembly (step 3622) and the filling of the gap between the two substrates with a fluid or lubricant (step 3624), filling the display assembly with fluid. As indicated in the discussions of display apparatus 500, the two substrates of a display apparatus are preferably separated by a gap, such as the gap 526, and the gap is filled by a fluid, such as working fluid 530. For many displays the fluid acts as a lubricant which substantially surrounds the MEMS light modulators. The fluid also has defined electrical and optical properties as discussed above. In one embodiment, one or more of the filling holes will be sealed 3626 at this time, and then you induce the formation of at least one seed bubble 3625 within a bubble trapping region. In another embodiment, the any and all filling holes are sealed after the bubble is induced into the bubble trapping region 3628.

The cell assembly method 3600 will now be reviewed for its application to the MEMS-up display configuration, examples for which are given by display assembly 500 of FIG. 5. For the MEMS-up display configuration both the control matrix and the MEMS modulator array are fabricated on the first substrate at steps 3606 and 3608. Examples are given as modulator substrates. An aperture layer is deposited on the second substrate at step 3610.

As discussed with respect to display assembly 3100 there are embodiments where the MEMS modulator array is fabricated on the first substrate while the control matrix can be fabricated on the second substrate. The two substrates are in electrical communication by means of conductive spacers.

For the MEMS-up display configuration the second substrate is referred to as a cover plate, such as cover plate 522. The aperture layer, fabricated at step 3610, is referred to as a black matrix layer, such as black matrix 524, and is patterned into an array of apertures. The black matrix layer is preferably comprised of a light absorbing material to improve the ambient contrast of the display. After assembly, the black matrix apertures preferably overlap the MEMS light modulators which are located on the modulator substrate.

For the MEMS-up display assembly method 3600 the cover plate, i.e. the second substrate provided at step 3604, is preferably made of a transparent material, i.e. plastic or glass. For the MEMS-up assembly method, however, the modulator substrate provided at step 3602 can be made from an opaque material, such as silicon. For instance, for a reflective MEMS-up display, the first substrate, e.g. silicon, can be coated with a reflective layer at one of steps 3606 or 3608. For a transmissive MEMS-up display, an opaque material employed for the first substrate can be etched with an array of through-holes at the positions of apertures, such as apertures 508.

For the MEMS-up display assembly 3600, spacers are applied at step 3612, and seal material is applied at step 3614 to either of the first or second substrates, i.e. either the modulator substrate or the cover plate. As with the case of the MEMS-down, the seal material is applied completely around the periphery of the space enclosed by the seal, leaving one or more openings that will be later sealed in a fashion similar to that described above for MEMS-down.

The subsequent steps in a MEMS-up display assembly method 3600 are similar to the MEMS-down display assembly method 3600, including the alignment step 3618, the cure of seal material, step 3620, the separation of multiple displays from the panel, step 3622, fluid filling at step 3624, as well as final sealing step 3626 and 3628.

As described with respect to the alignment apparatus 3600, the assembly method 3600 in either the MEMS-up or the MEMS-down configuration is applicable to a number of alternate MEMS light modulator technologies, including electrowetting displays and rolling-actuator displays. The MEMS-up display assembly method 3600 is particularly applicable to interference modulator displays and MEMS light tap modulator displays.

However, it is critical to the operation of the apparatus embodied here that steps be taken that cause a seed bubble to be formed within at least one of the bubble trapping region(s). For this reason, a process that is capable of creating a single bubble within the fluid is preferred.

Figure 16:
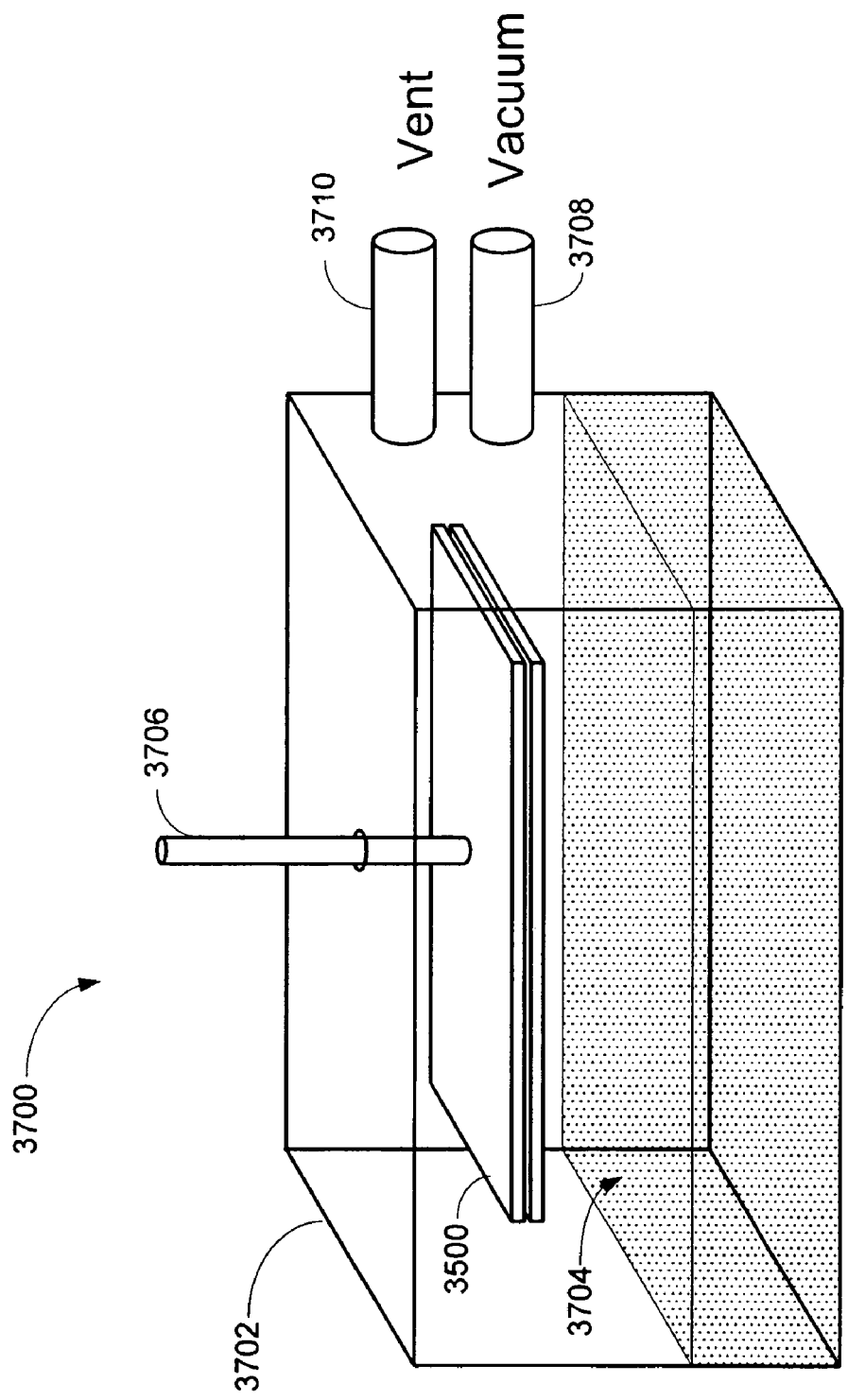
FIGS. 16 and 18 are conceptual views of fluid filling apparatuses, according to illustrative embodiments of the invention.

The details of the fluid filling process (step 3624) will be described with respect to the fluid filling apparatus 3700 which is illustrated in FIG. 16, according to an illustrative embodiment of the invention. The fluid fill apparatus is formed from a vacuum chamber 3702 which is partially filled with a reservoir of the working fluid 3704. An aligned and partially sealed cell assembly or panel assembly, such as panel assembly 3500, is suspended above the fluid reservoir by a wand 3706, or alternately by a moveable platter. Attached to the vacuum chamber is a port 3708 leading to a vacuum pump and a port 3710 used to vent the interior of the vacuum chamber to atmospheric pressure. Valves are associated with each of the ports 3708 and 3710, although not shown in FIG. 16.

In an alternate design, the panel assembly 3500 need not be suspended by a moveable wand, such as wand 3706. Instead the panel assembly can be fixed in place and the lubricant 3705 can be moved into or out of the vacuum chamber 3702 by means of a series of valves. The chamber is evacuated while fluid is largely absent from the chamber. After evacuation, the fluid level in the chamber is increased by flowing additional fluid into the chamber. Fluid is added until the assembly 3500 is immersed in fluid. After immersing the panel in fluid the system is vented to atmospheric pressure to fill the gap with fluid.

In operation, the process for filling the gap between the substrates in a panel assembly, such as assembly 3500, is a two-step process. First the air or other gas is removed from between the two plates and, second, the gap is filled by the fluid. Air is removed from between the plates when the valve to the vacuum pump is opened and the whole chamber 3702 is reduced to a pressure substantially below 1 torr. Next the vacuum valve is closed and the wand 3706 is used to partially immerse the panel assembly 3500 into the reservoir 3704 of the working fluid. At this time, in one embodiment, when the bubble trapping region retains the appropriate bubble, the opening exposed to the vacuum is sealed. The vent valve is opened to the air, or to clean nitrogen or argon gas from a bottle. The returning air brings the pressure on all fluids back to atmospheric pressure (or pressures greater than 600 torr), and the other filling gap (which used to be immersed in the fluid) is sealed. When the cell assembly is removed from the chamber 3702 the cell assembly is substantially filled by the fluid.

In an alternate embodiment, the complete space enclosed by the seal is filled with fluid, then an appropriate bubble is induced by mechanically pressing the walls of the display, which would force the exit of a portion of the working fluid, then releasing a portion of the pressure, which would induce the display to allow an amount of the gas within the chamber 3702 to enter through the fill hole and create the seed bubble in the bubble trapping region. This embodiment has the advantage of creating the bubble at room temperature.

In another embodiment, the space enclosed by the seal is completely filled with fluid and only one filling hole is left opened. The temperature of the fluid is then raised, and the working fluid at the elevated temperature proceeds to increase its pressure, a portion exits the display via the fill hole. The temperature is next lowered, and a portion of the gas within the filling chamber enters the display volume. Again, because of the proximity of the bubble trapping region to the fill hole, the entering gas goes into the bubble trapping region, creating the seed bubble. In the above embodiments, the filling hole would then be sealed, thus completing the assembly step 3624. In one embodiment, this temperature increase is created by using means such as a plasma torch.

Another illustrative embodiment is accomplished when the display is filled with the working fluid, which is at high temperature, and then the fill hole is sealed. Care is taken to ensure that the bubble trapping region is located at the lowest gravitational point. In one embodiment, this will be accomplished by making this the highest point in the assembly. To ensure this the display may be up-ended. When the temperature is lowered in a slow, controlled fashion, the seed bubble will naturally form at a certain temperature (again, dependent on the display volume being filled, the working fluid being used, etc.), and the seed bubble will naturally form at the point with the lowest gravity force exerted on it. In this fashion, stationary unit will have the bubble form at the highest elevation point in the display. Since the display has been tilted to ensure this is the spot containing the bubble trapping region, it naturally occurs within it. Note that the same effect may be accomplished by placing the display in a centrifuge, and making the above point the closest to the center in a centrifuge. In yet another embodiment, a similar effect may be accomplished by exposing the location of the display where the bubble is desired to extreme cooling while the rest of the display is maintained at a higher temperature.

Figure 17:
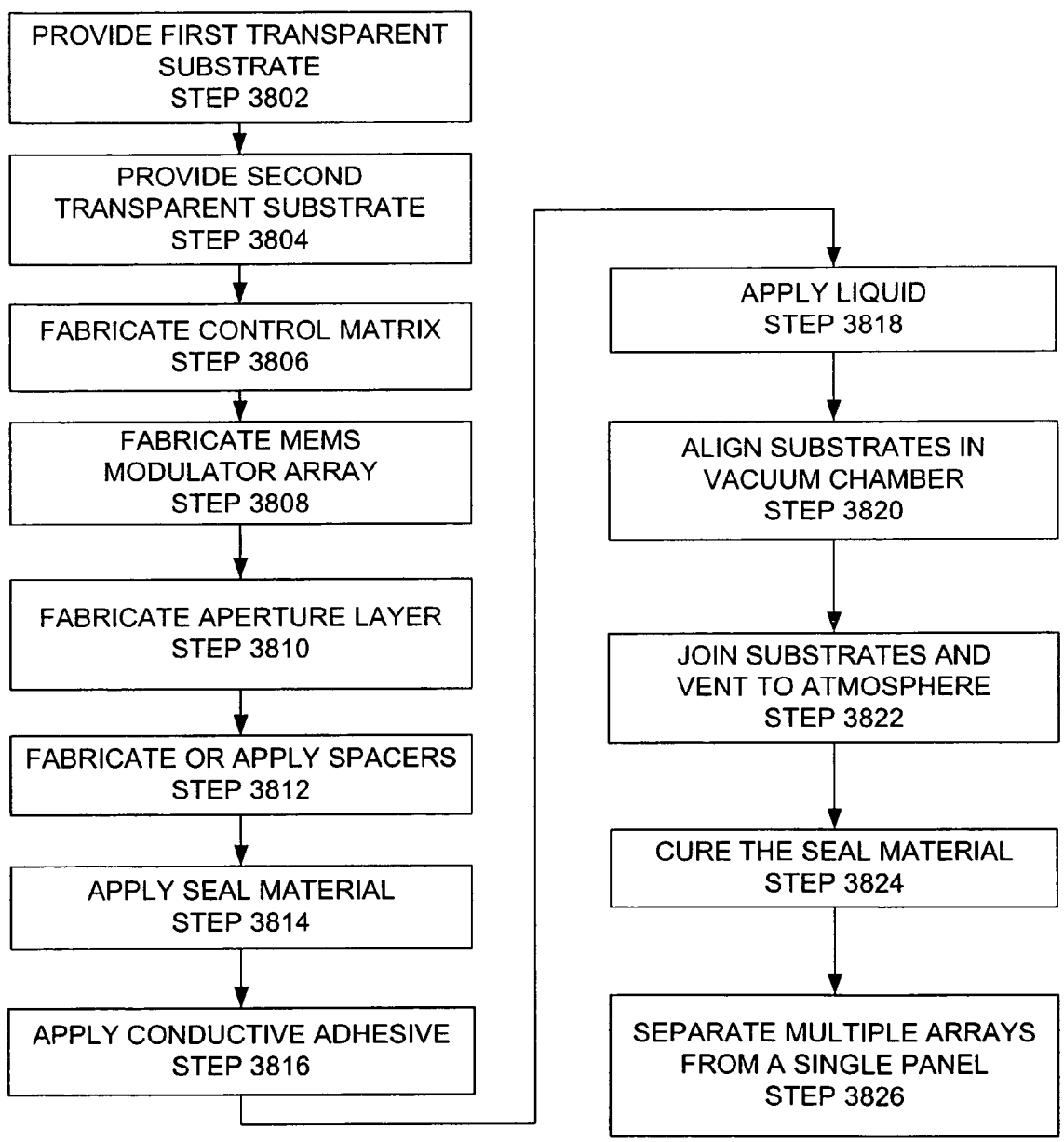
FIG. 17 is a flow chart of a cell assembly method, according to an illustrative embodiment of the invention.

The assembly method 3800, illustrated in FIG. 17, sometimes called the one-fill method, begins with the provision of first and second substrates, steps 3802 and 3804 and continues with the fabrication of the control matrix (step 3806), the fabrication of a MEMS modulator array (step 3808), the fabrication of an aperture layer (step 3810), and the application of spacers (step 3812). These steps comprise substantially the same assembly processes as were used for corresponding steps in the assembly method 3600.

The method 3800 continues at step 3814 with the application of a seal material. Similar seal materials and similar dispense methods can be applied at step 3814 as were used for the seal application step 3612. For the step 3814, however, filling holes are left in the seal material on the sides that will be exposed when the panel is separated into strips (i.e. those ends not connecting one display to the other on the strip). As before, in one embodiment we can accomplish the procedure while leaving a single hole, whereas in another embodiment two or more fill holes are located in the periphery (either in opposite sides, or any combination of sides). Regardless of the number of holes used, after applying the seal material 3814, the conducive adhesive is applied 3816 and fluid 3818 is deposited on the dike formed by the sealing material periphery. The substrates are then aligned in the vacuum chamber 3820, and the bubble is induced with any of the embodiments described before. Once the bubble is inside, the adhesive is cured.

In assembly process 3600 the singulation step 3622 precedes the fluid filling step 3624, meaning that the cell assemblies for individual displays are loaded into vacuum chamber 3702 for fluid filling. The vacuum fill chamber 3702 can include a platter capable of holding and immersing multiple individual displays in a single pump-down operation--so that multiple displays can be filled with fluid at the same time. Alternately it is possible to reverse the orders of these steps and load a complete panel assembly, such as assembly 3500 into the vacuum chamber. The gaps within each of the displays on the panel are then evacuated and filled at the same time. Similarly, the seed bubbles are induced into the respective bubble trapping regions via any of the embodiments described elsewhere in the specification. The dicing or singulation process 3622 then occurs after the fluid filling step 3624 is complete.

The final steps for assembling a display, after completion of the method 3600, are often referred to collectively as the module assembly process. The module assembly incorporates the steps of attaching a silicon chip or chips comprising control and drive circuitry directly to the glass substrate, bonding flexible circuits for interconnecting the display to external devices, bonding optical films such as contrast filters, affixing a backlight, and mounting the display into a support structure or enclosure. The flexible circuit may be comprised of simple interconnects or may contain additional electrical elements such as resistors, capacitors, inductors, transistors or integrated circuits.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any preferred embodiments are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. The invention may be embodied in other specific forms without departing from the spirit or essential characteristics thereof. The forgoing embodiments are therefore to be considered in all respects illustrative, rather than limiting of the invention. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A display apparatus comprising:
a first substrate supporting an array of light modulators;
a second substrate separated from the first substrate by a gap;
a fluid substantially filling the gap;
sealing material joining the first substrate to the second substrate; and
a bubble trapping region within a space enclosed by the sealing material for substantially constraining a location of a bubble trapped within the gap,
wherein the bubble trapping region extends along a majority of a side of at least one of the substrates.

2. The apparatus of claim 1, wherein the first substrate possesses a plurality of light modulators for modulating light.

3. The apparatus of claim 1, wherein the second substrate comprises one of a color filter array or an aperture layer formed thereon.

4. The apparatus of claim 3, wherein the light modulators on said first substrate are MEMS light modulators.

5. The apparatus of claim 4, wherein the MEMS light modulators comprise shutter-based light modulators.

6. The apparatus of claim 4, wherein the MEMS light modulators comprise electrowetting light modulators.

7. The apparatus of claim 1, wherein the light modulators comprise liquid crystal modulators.

8. The apparatus of claim 1 wherein the upper and lower substrates are electrically connected through the use of conductive pads and spacers.

9. The apparatus of claim 1 wherein the gap has a first size about the array of light modulators, and
the bubble trapping region is defined by a region having a second larger gap size positioned away from the array of light modulators.

10. The apparatus of claim 9, wherein a surface of the first substrate facing the second substrate includes a recess formed therein, thereby resulting in the second gap size being larger than the first gap size.

11. The display apparatus of claim 9, wherein the display apparatus further comprises a film deposited on one of the first and second substrates on a surface facing the other of the first and second substrates at about the array of light modulators, thereby resulting in the first gap size being smaller than the second gap size.

12. The apparatus of claim 1 wherein the bubble trapping region within the space enclosed by the sealing material is formed by a plurality of spaced-apart spacers across the gap,
wherein the spacing of said spaced-apart spacers is sufficiently small to constrain the position of the bubble.

13. A display apparatus comprising:
a first substrate supporting an array of light modulators;
a second substrate separated from the first substrate by a gap;
a fluid substantially filling the gap;
sealing material joining the first substrate to the second substrate; and
a bubble trapping region within a space enclosed by the sealing material for substantially constraining a location of a bubble trapped within the gap,
wherein the fluid has a viscosity less than 70 centipoise.

14. The apparatus of claim 13, wherein the first substrate possesses a plurality of light modulators for modulating light.

15. The apparatus of claim 13, wherein the second substrate comprises one of a color filter array or an aperture layer formed thereon.

16. The apparatus of claim 13, wherein the light modulators on said first substrate are MEMS light modulators.

17. The apparatus of claim 16, wherein the MEMS light modulators comprise shutter-based light modulators.

18. The apparatus of claim 16, wherein the MEMS light modulators comprise electrowetting light modulators.

19. The apparatus of claim 13, wherein the light modulators comprise liquid crystal modulators.

20. The apparatus of claim 13 wherein the upper and lower substrates are electrically connected through the use of conductive pads and spacers.

21. The apparatus of claim 13 wherein the fluid has a viscosity of less than 10 centipoise.

22. The apparatus of claim 13 wherein the fluid comprises materials with molecular weights below 4000 grams per mole.

23. The apparatus of claim 13 wherein the fluid comprises materials with molecular weights below 400 grams per mole.

24. The apparatus of claim 13 wherein the fluid comprises one of hexamethyldisiloxane and polydimethylsiloxane.

25. The apparatus of claim 13 wherein the gap has a first size about the array of light modulators, and
the bubble trapping region is defined by a region having a second larger gap size positioned away from the array of light modulators.

26. The apparatus of claim 25, wherein a surface of the first substrate facing the second substrate includes a recess formed therein, thereby resulting in the second gap size being larger than the first gap size.

27. The apparatus of claim 26 wherein the substrates across the gap are electrically connected through the use of conductive pads and spacers.

28. The apparatus of claim 26, wherein the light modulators are MEMS light modulators.

29. The apparatus of claim 25, wherein the display apparatus further comprises a film deposited on one of the first and second substrates on a surface facing the other of the first and second substrates at about the array of light modulators, thereby resulting in the first gap size being smaller than the second gap size.

30. The apparatus of claim 29 wherein the substrates across the gap are electrically connected through the use of conductive pads and spacers.

31. The apparatus of claim 29, wherein the light modulators are MEMS light modulators.

32. The apparatus of claim 13 wherein the bubble trapping region within the space enclosed by the sealing material is formed by a plurality of spaced-apart spacers across the gap, wherein the spacing of said spaced-apart spacers is sufficiently small to constrain the position of the bubble.

33. A method of manufacturing an assembly comprising the steps of:
providing a first substrate;
providing a second substrate separated from the first substrate by a gap;
forming of at least one bubble trapping region on at least one portion of one of the substrate surfaces;
joining both substrates by placing a sealing material partially around the periphery of the substrates;
substantially filling the space created by the sealing material with a working fluid;
inducing the formation of a bubble at or near the bubble trapping region to position the bubble within the bubble trapping region; and
sealing the space.

34. The method of claim 33, wherein on one of the two substrates a plurality of MEMS light modulators has been fabricated, with each MEMS light modulator having a light state and a dark state.

35. The method of claim 34, wherein the MEMS light modulators comprise shutter-based light modulators.

36. The method of claim 34, wherein the MEMS light modulators comprise electrowetting light modulators.

37. The method of claim 33, wherein the light modulators comprise liquid crystal modulators.

38. The method of claim 33, wherein the bubble trapping region is formed by one of acid etching, laser etching, spark-cutting, plasma etching, mechanical drilling, sawing, or sandblasting.

39. The method of claim 33, wherein the bubble is induced into the bubble trapping region by controlled changes to one of pressure and temperature within the gap.

40. The method of claim 33, wherein the bubble is induced into the bubble trapping region after the sealing of the space.

41. The method of claim 33, wherein the bubble is induced into the bubble trapping region prior to the sealing of the space.

* * * * *